(12) United States Patent
Lu

(10) Patent No.: US 11,477,306 B2
(45) Date of Patent: Oct. 18, 2022

(54) WIRELESS COMMUNICATION METHODS AND DEVICES

(71) Applicant: GUANGDONG OPPO MOBILE TELECOMMUNICATIONS CORP., LTD., Guangdong (CN)

(72) Inventor: Qianxi Lu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/316,852

(22) Filed: May 11, 2021

(65) Prior Publication Data

US 2021/0266385 A1 Aug. 26, 2021

Related U.S. Application Data

(63) Continuation of application No. PCT/CN2019/085340, filed on Apr. 30, 2019.

(51) Int. Cl.
*G06F 15/16* (2006.01)
*H04L 69/04* (2022.01)

(52) U.S. Cl.
CPC ................................. *H04L 69/04* (2013.01)

(58) Field of Classification Search
CPC ........................................................ H04L 69/04
USPC ................................................. 709/203, 247
See application file for complete search history.

(56) References Cited

U.S. PATENT DOCUMENTS

| | | | |
|---|---|---|---|
| 6,542,931 B1* | 4/2003 | Le | H04L 1/1621 341/60 |
| 8,391,148 B1* | 3/2013 | Wang | H04L 41/0803 370/235 |
| 2010/0177693 A1 | 7/2010 | Ryu et al. | |
| 2013/0121345 A1* | 5/2013 | Zhang | H04L 69/22 370/465 |
| 2014/0233633 A1 | 8/2014 | Hannuksela | |
| 2014/0369365 A1* | 12/2014 | Denio | H04L 69/16 370/474 |
| 2019/0116521 A1* | 4/2019 | Qiao | H04W 28/06 |
| 2019/0124181 A1 | 4/2019 | Park et al. | |

FOREIGN PATENT DOCUMENTS

| | | |
|---|---|---|
| CN | 102075287 A | 5/2011 |
| CN | 103188247 A | 7/2013 |
| CN | 106817365 A | 6/2017 |
| EP | 1603304 A1 | 12/2005 |
| JP | 2012169764 A | 9/2013 |

(Continued)

OTHER PUBLICATIONS

3GPP TSG-RAN WG2 #105—Tdoc R2-1901369—Athens, Greece, Feb.25-Mar. 1, 2019—EricssonN [104#37][NR/IIoT] Ethernet Header Compression email discussion report, TP K30 pages).

(Continued)

*Primary Examiner* — Duyen M Doan
(74) *Attorney, Agent, or Firm* — Perkins Coie LLP

(57) ABSTRACT

A wireless communication method and device are provided. The method includes: a compression device sending a first data packet or a second data packet according to a compression parameter of an Ethernet frame, the second data packet being a compressed data packet of the first data packet.

16 Claims, 9 Drawing Sheets

(56) References Cited

FOREIGN PATENT DOCUMENTS

| RU | 2345494 C2 | 1/2009 | |
|---|---|---|---|
| WO | 02058352 A1 | 7/2002 | |
| WO | 2011057154 A1 | 5/2011 | |
| WO | WO-2020125988 A1 * | 6/2020 | ............. H04L 69/04 |

OTHER PUBLICATIONS

International Search Report dated Jan. 23, 2020 of PCT/CN2019/085340 (4 pages).
Office Action for Russian Application No. 2021113471 dated Sep. 17, 2021. 12 pages with English translation.
Decision to Grant a Patent for Russian Application No. 2021113471 dated Feb. 10, 2022. 23 pages with English translation.
Examination Report for Indian Application No. 202127028672 dated Feb. 24, 2022. 5 pages with English translation.
Examination Report No. 1 for Australian Application No. 2019443141 dated Feb. 23, 2022. 3 pages.
Extended European Search Report for European Application No. 19927399.6 dated Dec. 16, 2021. 7 pages.
Examiner's Report for Canadian Application No. 3,117,837 dated May 12, 2022. 4 pages.
First Office Action for Chinese Application No. 202110429238.6 dated Aug. 10, 2022. 17 pages with English translation.
Notice of Reasons for Refusal for Japanese Application No. 2021-537868 dated Aug. 19, 2022. 15 pages with English translation.
OPPO "Discussion on Ethernet Header Compression" R2-1903223; 3GPP TSG-RAN WG2 Meeting #105bis; Xi'an, China; Apr. 8-12, 2019. 4 pages.
Sony "PDCP based Ethernet Header Compression" R2-1904204; 3GPP TSG-RAN WG2 Meeting #105bis; Xi'an, China; Apr. 8-12, 2019. 4 pages.

* cited by examiner

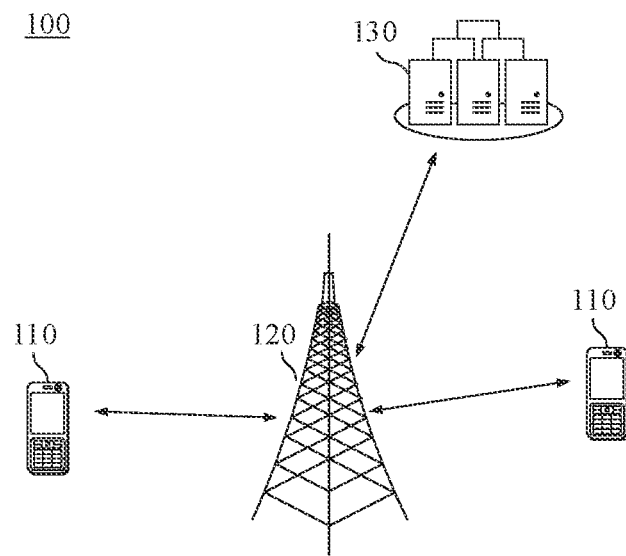
FIG. 1
| D-MAC | S-MAC | Type | Data | CRC |
FIG. 2
| D-MAC | S-MAC | Length | Data | CRC |
FIG. 3
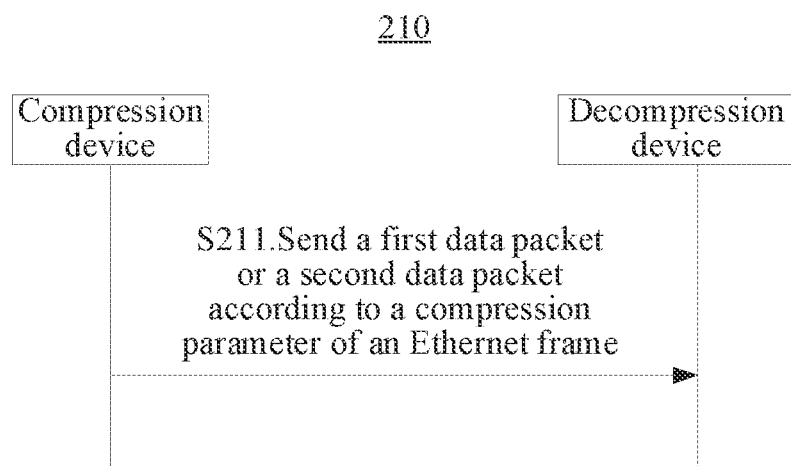
FIG. 4

WIRELESS COMMUNICATION METHODS AND DEVICES

This application is a continuation application of International PCT Application No. PCT/CN2019/085340 filed on Apr. 30, 2019, the entire content of which is hereby incorporated by reference.

TECHNICAL FIELD

Implementations of the present disclosure relate to the field of communications, and more particularly, to wireless communication methods and devices.

BACKGROUND

The 5G Industrial Internet of Things (IoT) supports transmission of services such as factory automation, transport industry and electrical power distribution in 5G systems. The IIoT, based on its transmission requirements for time delay and reliability, introduces the concept of time sensitive network (TSN) or time-sensitive communication (TSC), and related discussions have been carried out under TSN network related topics. In TSN networks, data packets can be transmitted in an Ethernet frame format.

However, in the existing communication system, the supported protocol data unit (PDU) session transmission only includes a data packet format based on Internet Protocol (IP), and the supported compression method only includes a method of performing header compression based on IP data packets. In 5G NR systems, because support for TSC is introduced, the type of PDU session can be not only an IP packet type, but also an Ethernet frame type.

Therefore, how to implement compression and transmission of Ethernet frame data packets is a technical problem to be solved urgently by those skilled in the art.

SUMMARY

An implementation of the present disclosure provides wireless communication methods and devices.

In a first aspect, there is provided a data transmission method including:

a compression device sending a first data packet or a second data packet according to a compression parameter of an Ethernet frame, the second data packet being a compressed data packet of the first data packet.

In a second aspect, there is provided a communication method including:

a decompression device receiving a target data packet; and the decompression device determining whether to decompress the target data packet.

In a third aspect, there is provided a compression device, which is used for performing the method according to the first aspect described above or various implementations thereof.

Specifically, the compression device includes function modules for performing the method according to the first aspect described above or various implementations thereof.

In a fourth aspect, there is provided a decompression device, which is used for performing the method according to the second aspect described above or various implementations thereof.

Specifically, the decompression device includes function modules for performing the method according to the second aspect described above or various implementations thereof.

In a fifth aspect, there is provided a compression device including a processor and a memory.

The memory is used for storing a computer program, and the processor is used for calling and running the computer program stored in the memory to execute the method according to the first aspect described above or various implementations thereof.

In a sixth aspect, there is provided a decompression device including a processor and memory.

The memory is used for storing a computer program, and the processor is used fir calling and running the computer program stored in the memory to execute the method according to the second aspect described above or various implementations thereof.

In a seventh aspect, there is provided a chip for implementing the methods according to any one of the first and second aspects described above or various implementations thereof.

Specifically, the chip includes a processor fir calling and running a computer program from a memory, so that a device having the chip installed thereon executes the methods according to any one of the first and second aspects described above or various implementations thereof.

In an eighth aspect, there is provided a computer readable storage medium for storing a computer program that causes a computer to execute the methods according to any one of the first and second aspects described above or various implementations thereof.

In a ninth aspect, there is provided a computer program product including computer program instructions that cause a computer to execute the methods according to any one of the first and second aspects described above or various implementations thereof.

In a tenth aspect, there is provided a computer program, which, when running on a computer, causes the computer to execute the methods according to any one of the first and second aspects described above or various implementations thereof.

BRIEF DESCRIPTION OF DRAWINGS

FIG. 1 is a schematic diagram of an architecture of a communication system in accordance with an implementation of the present disclosure.

FIG. 2 is a schematic diagram of a frame format in accordance with an implementation of the present disclosure.

FIG. 3 is a schematic diagram of another frame format in accordance with an implementation of the present disclosure.

FIG. 4 is a schematic flowchart of a wireless communication method in accordance with an implementation of the present disclosure.

DETAILED DESCRIPTION

Figure 5:
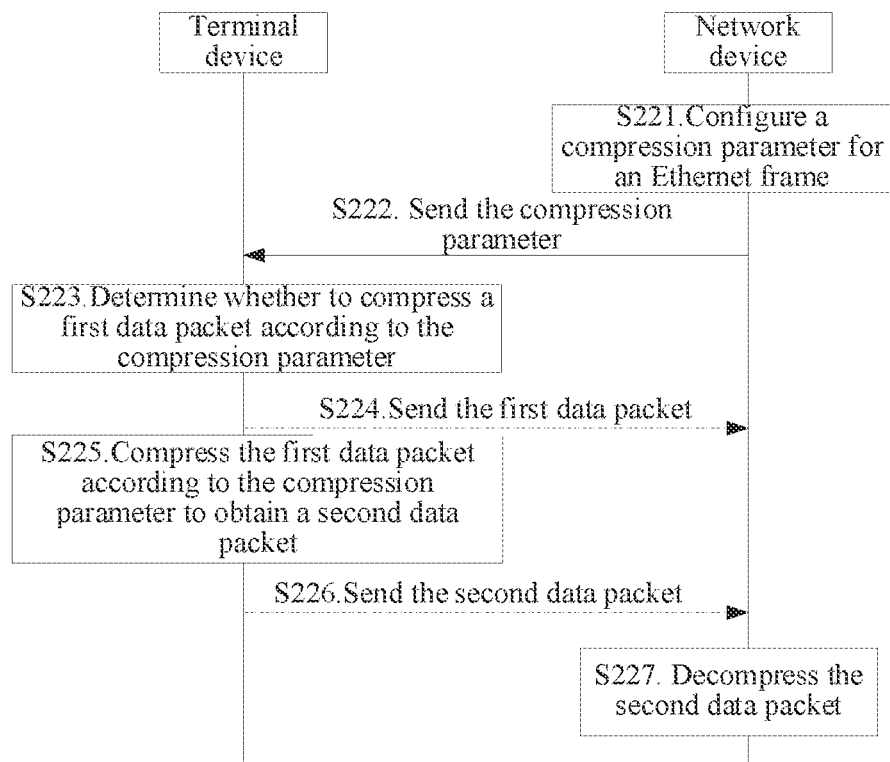
FIG. 5 is a schematic flowchart of another wireless communication method in accordance with an implementation of the present disclosure.

Technical schemes in implementations of the present disclosure will be described below in combination with the drawings in the implementations of the present disclosure. It is apparent that the implementations described are just some of the implementations of the present disclosure, but not all of the implementations of the present disclosure. According to the implementations of the present disclosure, all other implementations achieved by a person of ordinary skill in the art without making inventive efforts are within the protection scope of the present disclosure.

FIG. 1 is a schematic diagram of an application scenario in accordance with an implementation of the present disclosure.

As shown in FIG. 1, a communication system 100 may include terminal devices 110 and a network device 120. The network device 120 may communicate with the terminal device 110 via an air interface. Multi-service transmission is supported between the terminal device 110 and the network device 120.

It should be understood that the communication system 100 is only illustrated exemplarily in the implementations of the present invention, but the implementations of the present invention are not limited thereto, That is, the technical schemes in the implementations of the present invention may be applied to various communication systems, such as a Long Term Evolution (LTE) system, an LTE Time Division Duplex (TDD) system, a Universal Mobile Telecommunication System (UMTS), a 5G communication system (also called a New Radio (NR) communication system) or a future communication system.

In the communication system 100 shown in FIG. 1, the network device 120 may be an access network device communicating with the terminal devices 110. The access network device may provide communication coverage for a specific geographic area and may communicate with the terminal devices 110 (e.g., UE) located within the coverage area.

Optionally, the network device 120 may be an Evolutional Node B (eNB or eNodeB) in a a Long Term Evolution (LTE) system, or a Next Generation Radio Access Network (NG RAN) device, or a gNB in an NR system, or a radio controller in a Cloud Radio Access Network (CRAN), or the network device 120 may be a relay station, an access point, a vehicle-mounted device, a wearable device, a hub, a switch, a bridge, a router, or a network device in a future evolved Public Land Mobile Network (PLMN).

Optionally, the terminal devices 110 may be any terminal device, including but not limited to a terminal device connected to the network device 120 or other terminal devices via a wire or wirelessly. The terminal device may refer to an access terminal, user equipment (UE), a subscriber unit, a subscriber station, a mobile station, a rover station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing devices connected to a wireless modem, a vehicle-mounted device, a wearable device, a terminal device in a 5G network, or a terminal device in a future evolved Public Land Mobile Network (PLMN).

Optionally, device to device (D2D) communication may be established between the terminal devices 110.

The wireless communication system 100 may further include a core network device 130 that communicates with a base station. The core network device 130 may be a 5G core (5GC) network device, for example, an Access and Mobility Management Function (AMF) device, as another example, an Authentication Server Function (AUSF) device, as a still another example, a User Plane Function (UPF) device, and as a still another example, a Session Management Function (SMF) device. Optionally, the core network device 130 may also be an Evolved Packet Core (EPC) device of the LTE network, for example, a Session Management Function+Core Packet Gateway (SMF+PGW-C) device. It should be understood that the SMF+PGW-C device may implement functions which can be implemented by both the SMF device and the PGW-C device. In the process of network evolution, the above-mentioned core network device may also have other names, or new network entities may be formed by dividing the functions of the core network, which is not specifically limited in the implementations of the present disclosure.

In a specific example, connections may be established between various functional units in the communication system 100 via next generation (NG) interfaces to implement communication.

For example, the terminal device establishes an air interface connection with the access network device via an NR interface for transmitting user plane data and control plane signaling; The terminal device can establish a control plane signaling connection with the AMF device via NG interface 1 (N1 for short); the access network device, such as a next generation radio access base station (gNB), can establish a user plane data connection with the UPF device via NG interface 3 (N3 for short); the access network device can establish a control plane signaling connection with the AMF device via NG interface 2 (N2 for short); the IMF device can establish a control plane signaling connection with the SMF device via NG interface 4 (N4 for short); the UPF device can exchange user plane data with a data network via NG interface 6 (N6 for short); the AMF device can establish a control plane signaling connection with the SMF device via NG interface 11 (N11 for short); and the SMF device can establish a control plane signaling connection with a point coordination function (PCF) device via NG interface 7 (N7 for short). It should be noted that the part shown in FIG. 2 is only a diagram of an exemplary architecture, and in addition to the functional units shown in FIG. 1, the network architecture may also include other functional units or functional entities. For example, the core network device ma also include other functional units such as a unified data management (UDM) unit, which is not specifically limited in the implementations of the present disclosure.

FIG. 1 illustrates exemplarily one base station, one core network device and two terminal devices. Optionally, the radio communication system 100 may include a plurality of base station devices, and other numbers of terminal devices may be included within the coverage area of each base station device, which is not limited in the implementations of the present disclosure.

It should be understood that, devices with communication functions in a network/system in the implementations of the present disclosure may be all referred to as communication devices. Taking the communication system 100 shown in FIG. 1 as an example, a communication device may include a network device 120 and terminal devices 110 which have communication functions, and the network device 120 and the terminal devices 110 may be the devices described above, and will not be described repeatedly herein. The communication device may also include other devices in the communication system 100, for example, other network entities, such as network controllers and mobile management entities, and the implementations of the present disclosure are not limited thereto.

It should be understood that the terms "system" and "network" are often used interchangeably herein. The term "and/or" herein describes an association relationship between associated objects only, indicating that there may be three relationships, for example, A and/or B may indicate three cases: A alone, both A and B, and B alone. In addition, the symbol "/" herein generally indicates that there is a "or" relationship between the associated objects before and after "/".

Optionally, the implementations of the present disclosure can be used in a public land network or a local network.

The public land network may be a PLMN-based public land network.

The local network can also be called a local area network or a private network. The local network is usually laid out in an office scene, a home scene and a factory, so as to implement more effective and safe management. The local network is usually laid out by local users or managers. Generally, authorized accessible users have the right to access the local network.

The local network may or may not be managed or administered by the public land network.

Optionally, the local network can use unauthorized frequency bands for communication, or can share authorized frequency bands with the public land network.

Optionally, the local network may be a network belonging to the 3GPP category. A core network of the local network may be a core network of NR or LTE, and the local network may gain access to the core network through an NR access network, an LTE access network or Wireless Fidelity (WiFi).

Optionally, in the implementations of the present disclosure, the local network can share the core network with the public land network, while the access network is independent; or the access network can be shared, while the core network is independent; or both the access network and the core network can be shared; or neither the access network nor the core network is shared.

Optionally, in the implementations of the present disclosure, the core network can be shared by multiple or multiple types of local networks, while the access network is independent; or the access network can be shared and the core network is independent; or both the access network and the core network can be shared; or neither the access network nor the core network is shared.

A frame format of an Ethernet frame available in the implementations of the present disclosure will be described below.

Referring to FIG. 2, an Ethernet frame data packet may include a frame header (also called header) and a data part of an Ethernet frame, wherein the frame header of the Ethernet frame may include a destination address, a source address and a type, and the data part may include data, and optionally, the data part may also include padding bits. Optionally, the Ethernet frame data packet may also include two portions that are not transmitted in the 5G network, a preamble and a frame check sequence (FCS). The Ethernet frame shown in FIG. 2 may be of an Ethernet II frame type.

Referring to FIG. 3, an Ethernet frame data packet may include a frame header (also called a header) and a data part of an Ethernet frame, wherein the frame header of the Ethernet frame may include a destination address, a source address and a length, and the data part may include data, and optionally, the data part may also include padding bits. Optionally, the Ethernet frame data packet may also include two portions that are not transmitted in the 5G network, a preamble and a frame check sequence (FCS). The Ethernet frame shown in FIG. 3 may be of an IEEE 802.3 SNAP frame type.

In the frame format shown FIG. 2, field names and physical meanings can be depicted with reference to Table 1:

TABLE 1

| Field names and physical meanings | | |
|---|---|---|
| Field | Length | Physical meaning |
| Destination address | 6 bytes | Destination MAC address |
| Source address | 6 bytes | Source MAC address |
| Type | 2 bytes | Refer to a protocol type |

TABLE 1-continued

Field names and physical meanings

| Field | Length | Physical meaning |
|---|---|---|
| Length | 2 bytes | Refer to a byte length of subsequent data |
| Data | 46~1500 bytes | The minimum length of a data field must be 46 bytes to ensure that a frame length is at least 64 bytes, which means that the data field of 46 bytes must be used to transmit information of one byte. If information filled in the field is less than 46 bytes, the rest of the field must also be filled (i.e., filled with padding bits). The maximum length of the data field is 1500 bytes. |
| CRC | 4 bytes | be used for cyclic redundancy check (also called FCS or frame check sequence) of intra-frame subsequent byte errors. |

It should be understood that the frame formats shown in FIGS. 2 and 3 are illustrated as examples only, and are not limitations to the implementations of the present disclosure.

For example, in other alternative implementations, a VLAN field, which is used to carry or indicate information about a VLAN, may also be added to the frame formats shown in FIG. 2 or 3. The VLAN field can include one or two VLAN headers, that is, 802.1Q tags. The tag occupies 4 bytes. The information of the VLAN can include a tag protocol ID (TPID), a priority code point (PCP), a canonical format indicator (CFI)/drop eligible indicator (DEI) and a virtual local area network ID (VLAN ID, VID). The VLAN field can be at least one of T-tag, S-tag and C-tag.

Field names and physical meanings in the information of the VLAN can be depicted with reference to Table 2.

TABLE 2

Field names and physical meanings in the information of the VLAN

| Field | Length | Physical meaning |
|---|---|---|
| TPID | 2 bytes | Indicate a frame type. A value of 0x8100 indicates an 802.1Q Tag frame. If a device that does not support 802.1Q receives such a frame, it will be dropped. |
| PCP | 3 bits | Indicate a priority of the frame, its value range is 0~7, and the greater the value is, the higher the priority is. It is used to preferentially send high priority data packets when blocked. |
| CFI/DEI | 1 bit | The CFI indicates whether a MAC address is in a standard format. A CFI of 0 indicates a standard format, and a CFI of 1 indicates a non-standard format. It is used to distinguish Ethernet frames, fiber distributed digital interface (FDDI) frames and token ring network frames. In Ethernet, the value of the CFI is 0. The DEI indicates a drop priority in the 802.1ad protocol, and is used to identify a color of a message. For example, 0 identifies green and 1 identifies yellow. In the case of early drop based on color, yellow messages will be dropped when congestion occurs |
| VID | 12 bits | The VLAN ID indicates the VLAN to which the frame belongs. In VRP, a configurable VLAN ID ranges from 1 to 4094. The VID is defined as a reserved VLAN ID in 0 and 4095 protocols. Wireless frames can be divided into three types based on the VID: 1. A VID of an untagged frame is not ignored. 2. A VID of a priority-Tagged frame is 0x000. 3. A range of a VID of a VLAN-Tagged frame is 0~4095. Three special VIDs: 0x000: indicates a set priority hut there is no VID. 0x001: indicates a default VID. 0xFFF: indicates a reserved VID. |

It should also be understood that various implementations of the implementations of the present disclosure can also be applied to other types of frames except the Ethernet frame, which will not be repeated herein in the implementations of the present disclosure for the sake of brevity.

It should be noted that no matter whether the frame format is an Ethernet II frame format or an 802.3 frame format, the minimum length of a data field excluding an Ethernet header and a cyclic redundancy check (CRC) field is 46 bytes, that is, the total size of an Ethernet packet is at least 64 bytes. When the size of actual data of the data field is less than 46 bytes, padding bits need to be added to the actual data to ensure that its size is at least 46 bytes. However, transmission of the padding bits at the air interface will increase the loss of air interface resources and reduce the utilization rate of the air interface resources.

FIG. 4 is a schematic flowchart of a wireless communication method 210 in accordance with an implementation of the present disclosure. The method 210 includes at least part of the following contents. The method 210 can be used for downlink transmission, or uplink transmission, or sidelink transmission. The method 210 can be performed through interaction between a compression device and a decompression device. When the method 210 is used for downlink transmission, the compression device can be a network side device (e.g., an access network device or a core network device), and the decompression device can be a terminal device. When the method 210 is used for uplink transmission, the compression device can be a terminal device, and the decompression device can be a network side device (e.g., an access network device or a core network device). When the method 210 is used for sidelink transmission, both the compression device and decompression device are terminal devices. Further, transmission of Ethernet data packets can be unidirectional (uplink direction or downlink direction) or bidirectional (uplink direction and downlink direction). For transmission of uplink data packets, the compression device is a terminal device and the decompression device is a network device. For transmission of downlink data packets, the compression device is a network device and the decompression device is a terminal device. The UL direction, that is, the case where the terminal device is the compression device and the network device is the decompression device will be described by way of example.

In S211, the compression device sends a first data packet or a second data packet to the decompression device according to a compression parameter of an Ethernet frame.

The second data packet is a compressed data packet of the first data packet.

The compression device determines to send uncompressed data packets or compressed data packets to the decompression device according to the compression parameter. The decompression device at a decompression end receives a target data packet.

When the decompression device determines that the target data packet is the first data packet, the decompression device determines not to decompress or recover the target data packet and when the decompression device determines that the target data packet is the second data packet, the decompression device decompresses or recovers the target data packet.

Optionally, the decompression device determines whether to distinguish the target data packet to be the first data packet or the second data packet, that is, the compression device determines whether to distinguish or differentiate the target data packet. Specifically, the decompression device determines whether to distinguish or differentiate the target data packet according to the compression parameter of the Ethernet frame. Accordingly, the compression device determines whether to generate the first data packet and/or the second data packet, that is, the compression device determines whether to generate data packets of different classes. Specifically, the compression device determines whether to generate the first data packet and/or the second data packet according to the compression parameter of the Ethernet frame.

Optionally, the compression device receives the compression parameter sent by at least one of an access network device, a core network device and other network devices.

In other words, a first network entity configures the compression parameter of the Ethernet frame. The first network device may be at least one of an access network device, a network device or a core network. When the first network entity is the core network, header compression parameter information needs to be indicated to the terminal device and the access network device. When the first network entity is the access network device, the header compression parameter information may only be indicated to the terminal device.

The compression device sends the second data packet after receiving X uncompressed data packets; and/or the compression device sends the second data packet after receiving Y feedback packets of the uncompressed data packets representing acknowledgement (ACK).

Optionally, the compression device reports a compression capability, which is used to indicate whether the compression device supports compression of the Ethernet frame, and/or indicate supported compression objects.

Optionally, compression parameters corresponding to the same bearer are the same or different, and/or compression parameters corresponding to uplink and compression parameters corresponding to downlink are the same or different.

For example, compression parameters configured for UL and DL of one bearer are different, or only a UL compression parameter is configured for the same bearer (that is, only UL is compressed).

Implementation One

Optionally, the compression device determines whether to compress the first data packet according to the compression parameter.

It should be understood that the compression parameter is compression related information or information used for compressing the data packets, and its specific meanings are not limited in the implementations of the present disclosure.

For example, the compression parameter is used by the compression device to determine whether to compress the first data packet, or the compression parameter can be used by the compression device to determine how to compress the first data packet, or the compression parameter can be used by the compression device to determine to generate different types of data packets (compressed or uncompressed). Further, the compression parameter can also be used by the decompression device to determine whether the received target data packet is a compressed data packet, or the compression parameter can also be used by the decompression device to determine whether to decompress the data packets, or the compression parameter can also be used by the decompression device to determine how to decompress or recover the target data packet, or the compression parameter can also be used by the decompression device to determine whether different types of data packets (compressed or uncompressed) exist. The compression parameter may also be used to trigger the compression device to compress the first data packet, or the compression parameter may also be used to trigger the decompression end to decompress the target data packet. Specifically, when compression parameter configuration information is received, either starting time of compression or decompression is determined according to the compression parameter, or whether compression or decompression is executed or starts to be executed is determined.

The compression parameter is used to indicate whether an Ethernet frame data packet is compressed.

For example, when the compression parameter indicates that the Ethernet frame data packet is compressed, the compression device determines to compress the first data packet to obtain the second data packet.

As another example, when the compression parameter indicates the Ethernet frame data packet is not compressed, the compression device determines not to compress the first data packet, that is, the compression device sends the first data packet.

Optionally, the compression device determines a compression object in the first data packet.

For example, the compression device determines whether to compress the first data packet according to the compression parameter.

As another example, the compression device determines the compression object in the first data packet according to the compression parameter.

Optionally, the compression parameter is used by the compression end to determine whether to compress the Ethernet frame.

Optionally, the compression parameter is used by the compression end to determine a compression object of the Ethernet frame.

Optionally, the compression parameter is used to indicate a compression object of the Ethernet frame data packet.

Mode 1:

Optionally, the compression parameter includes a first index.

Optionally, when the first index is used to indicate that the Ethernet frame data packet is not compressed, the compression device sends the first data packet.

Optionally, when the first index is used to indicate that the Ethernet frame data packet is compressed, the compression device compresses the first data packet or the compression device is triggered to compress the first data packet.

Optionally, when the first index is used to indicate that the Ethernet frame data packet is compressed, the compression device first compresses the first data packet to obtain a compressed data packet of the first data packet and then sends the second data packet to the decompression device.

Optionally, the first index is used by the compression device to determine a first compression object corresponding to the first index.

That is, after the compression device determines the first compression object, the second data packet with the first compression object compressed.

For example, the first index is directly used to indicate the compression object of the Ethernet frame data packet.

For example, when the first index indicates that padding hits are compressed, the compression device directly compresses the padding bits in the first data packet.

For example, when the first index indicates that the padding bits are compressed, the compression device compresses the padding bits in the first data packet. Specifically, the compression device may determine whether to compress the padding hits in the first data packet according to the conditions.

As another example, the compression device determines the first compression object corresponding to the first index according to the first index and a first corresponding relationship, the first corresponding relationship including at least one compression object and an index corresponding to the at least one compression object, and the at least one compression object including the first compression object.

Optionally, the first corresponding relationship may be preconfigured information, such as protocol defined information.

Optionally, the first corresponding relationship may be information configured by the access network device, the core network device or other network devices to the terminal device.

Optionally, the first corresponding relationship may be information determined through negotiation between the network device and the terminal device.

Optionally, the compression objects can be divided based on compressible fields.

For example, when the first index indicates that an 802.1Q header is compressed, the compression device compresses the 802.1Q header in the first data packet.

It should be noted that for each sub-header in the 802.1Q header, the compression parameter can also indicate whether it is compressed.

That is, the compression object may also include each sub-header in the 802.1Q header.

For example, the at least one compression object includes at least one of:

a destination address field, a source address field, a type field, length field, a virtual local area network (VLAN) field, a Q-tag, a C-tag, an S-tag, a TPID, a VID, a PCP, a DEI and padding bits in a data field.

Optionally, for example, the at least one compression object further includes at least one of a Logical Link Control (LLC) header and a SubNetwork Access Protocol (SNAP) header.

Optionally, for example, the at least one compression object further includes at least one of the LLC header and each sub-header in the SNAP header.

Optionally, the first corresponding relationship can be shown in Table 3.

TABLE 3

First corresponding relationship

| Value of the first index | Compressed header |
|---|---|
| 1 | Uncompressed |
| 2 | Destination address |
| 3 | Source address |
| 4 | Type |
| 5 | Length |
| 6 | 802.1Q |
| 7 | Padding |
| 8 | Q-tag |
| 9 | C-tag |
| 10 | S-tag |
| 11 | TPID |
| 12 | VID |
| 13 | PCP |
| 14 | DEI |

As shown in Table 3, different values of the first index represent different compressible fields. For example, if the value of the first index received by the compression device is 1, the compression device will not compress the first data packet, that is, the compression device sends the first data packet to the decompression device. Considering the compression capability, compression efficiency of the terminal device or the format of the Ethernet packet, the configured compressed fields may be different for different terminal devices or different bearers. Optionally, the terminal device reports the compression capability to the network, where the reporting of the compression capability is used to indicate to the network whether the terminal device supports compression of the Ethernet frame and/or supports header compression for those sub-headers (which may include the padding field).

Optionally, the first corresponding relationship may be shown in Table 4.

TABLE 4

First corresponding relationship

| Value of the first index | Compression object | Meaning |
|---|---|---|
| 1 | Uncompressed | i.e., Ethernet header is not compressed |
| 2 | Destination address | Perform header compression on the destination address field |
| 3 | Source address | Perform header compression on the source address field |
| 4 | Type | Perform header compression on the type field |
| 5 | Length | Perform header compression on the length field |
| 6 | 802.1Q | Perform header compression on the VLAN header |
| 7 | Padding | Perform compression on the padding field |

As shown in Table 4, different values of the first index represent different compressible objects. For example, if the value of the first index received by the compression device is 1, the compression device will not compress the first data packet, that is, the compression device sends the first data packet to the decompression device. As another example, if the first index is 3, the compression device may compress the source address field in the first data packet to obtain the second data packet. Considering the compression capability, compression efficiency of the terminal device or the format of the Ethernet packet, the configured compressed fields may be different for different terminal devices or different bearers. Optionally, the terminal device reports the compression capability to the network, where the reporting of the compression capability is used to indicate to the network whether the terminal device supports compression of the Ethernet frame and/or supports header compression for those sub-headers (which may include the padding field).

It should be understood that Tables 3 and 4 are only examples of the present disclosure, and should not be understood as limitations to the present disclosure.

For example, in other alternative implementations, one index may also correspond to multiple fields. For example, when the value of the first index is 5, the compression object corresponding to the first index may include the source address field, the destination address field and the VLAN header. As another example, when the value of the first index is 5, the compression object corresponding to the first index may include the source address field, the destination address field, the length field and the VLAN header.

Optionally, the compression objects can also be divided based on the frame format of the Ethernet frame (i.e., whether there is the VLAN field or the padding field).

For example, the at least one compression object includes at least one of:
a Q-tag and a frame header of the Ethernet frame;
a C-tag and a frame header of the Ethernet frame;
an S-tag and a frame header of the Ethernet frame;
a C-tag an S-tag and a frame header of the Ethernet frame;
a Q-tag, a frame header of the Ethernet frame and padding bits;
a C-tag, a frame header of the Ethernet frame and padding bits;
an S-tag, a frame header of the Ethernet frame and padding bits;
a C-tag, an S-tag, a frame header of the Ethernet frame and padding bits;
padding bits;
a Q-tag and padding bits;
a C-tag and padding bits;
an S-tag and padding bits;
a C-tag, an S-tag and padding bits;
a frame header of the Ethernet frame;
a Q-tag;
a C-tag;
an S-tag;
a C-tag and an S-tag;
a destination address field;
a source address field;
a type field; and
a length field.

Optionally, the frame header of the Ethernet frame includes at least one of:
a destination address field;
a source address field;
a type field; and
a length field.

Optionally, the first corresponding relationship may be shown in Table 5.

TABLE 5

First corresponding relationship

| Value of first information | Compression object |
|---|---|
| 1 | Q-tag and frame header of Ethernet frame |
| 2 | C-tag and frame header of Ethernet frame |

TABLE 5-continued

First corresponding relationship

| Value of first information | Compression object |
|---|---|
| 3 | S-tag and frame header of Ethernet frame |
| 4 | C-tag, S-tag and frame header of Ethernet frame |
| 5 | Q-tag, frame header of Ethernet frame and padding bits |
| 6 | C-tag, frame header of Ethernet frame and padding bits |
| 7 | S-tag and frame header of Ethernet frame and padding bits |
| 8 | C-tag, S-tag, frame header of Ethernet frame and padding bits |
| 9 | Padding bits |
| 10 | Q-tag and padding bits |
| 11 | C-tag and padding bits |
| 12 | C-tag, S-tag and padding bits |
| 13 | Frame header of Ethernet frame |
| 14 | Q-tag |
| 15 | C-tag |
| 16 | S-tag |
| 17 | C-tag and S-tag |
| 18 | Destination address field |
| 19 | Source address field |
| 20 | Type field |
| 21 | Length field |
| 22 | Uncompressed |

Refer to Table 5, different values of the first index represent different compressible objects. For example, if the value of the first index received by the compression device is 22, the compression device will not compress the first data packet, that is, the compression device sends the first data packet to the decompression device. As another example, if the value of the first index is 21, the compression device will compress the length field in the first data packet to obtain the second data packet, and then send the second data packet to the decompression device. As another example, if the value of the first index is 5, the compression device will compress the Q-tag, the frame header of the Ethernet frame and the padding bits in the first data packet to obtain the second data packet. Considering the compression capability, compression efficiency of the terminal device or the format of the Ethernet packet, the configured compressed fields may be different for different terminal devices or different bearers. Optionally, the terminal device reports the compression capability to the network, where the reporting of the compression capability is used to indicate to the network whether the terminal device supports compression of the Ethernet frame and/or supports header compression for those sub-headers (which may include the padding field).

Optionally, the first corresponding relationship may be shown in Table 6.

TABLE 6

First corresponding relationship

| Value of first information | Compression object | Meaning |
|---|---|---|
| 1 | Uncompressed | 1.e., Ethernet header is not compressed |
| 2 | Ethernet frame without Q-tag | Perform header compression on Ethernet header excluding Q-tag |
| 3 | Ethernet frame with C-tag/S-tag | Perform header compression on C/S-tag + Ethernet header |

TABLE 6-continued

First corresponding relationship

| Value of first information | Compression object | Meaning |
|---|---|---|
| 4 | Ethernet frame with C-tag and S-tag | Perform header compression on C/S-tag + Ethernet header |
| 5 | Ethernet frame without S-tag + padding | Perform header compression on Ethernet header excluding Q-tag + padding |
| 6 | Ethernet frame with C-tag/S-tag + padding | Perform header compression on C/S-tag + Ethernet header + padding |
| 7 | Ethernet frame with C-tag and S-tag + padding | Perform header compression on C/S-tag + Ethernet header + padding |
| 8 | Padding bits | Compress padding field |

Referring to Table 6, different values of the first index represent different compressible objects. For example, if the value of the first index received by the compression device is 1, the compression device will not compress the first data packet, that is, the compression device sends the first data packet to the decompression device. As another example, if the value of the first index is 2, the compression device will perform header compression on the Ethernet header excluding the Q-tag in the first data packet to obtain the second data packet, and then send the second data packet to the decompression device. Considering the compression capability, compression efficiency of the terminal device or the format of the Ethernet packet, the configured compressed fields may be different for different terminal devices or different bearers. Optionally, the terminal device reports the compression capability to the network, where the reporting of the compression capability is used to indicate to the network whether the terminal device supports compression of the Ethernet frame and/or supports header compression for those sub-headers (which may include the padding field).

Optionally, the compression device determines whether to compress the first data packet according to the first index.

Optionally, the compression device determines the compression object in the first data packet according to the first index.

In the compression parameter, the first index is used by the compression device to determine the compression object, for example, indicate that the destination address field and the source address field are processed. For example, with reference to Table 5, when the value of the first index is 21, it is indicated that the compression will be not performed; when the value of the first index is 1, it is indicated that the compression will be performed (at which point it is also indicated that the Ethernet header compression is performed), that is, the compression device compresses the Q-tag and the frame header of the Ethernet frame.

It should be understood that the first index may also be only used to indicate whether the Ethernet frame data packet is compressed. At this time, the compression device can directly determine the compression object according to the first corresponding relationship, or the compression device can also determine the compression object according to another indication information for indicating the compression object or a second index, and then the compression device compresses the first data packet according to the determined compression object.

It should be understood that Table 4 is only an example of the present disclosure and should not be understood as a limitation to the present disclosure.

For example, in other alternative implementations, one index may also correspond to multiple compression objects. For example, when the value of the first index is 1, the compression object corresponding to the first index may be one of the Q-tag and the C-tag, and the header frame of the Ethernet frame.

Optionally, one index in the first corresponding relationship corresponds to one or more compression objects.

Optionally, the first index includes a plurality of indexes.

For example, the first index may include a plurality of bits, that is, the first index may indicate whether a plurality of fields is compressed through the plurality of bits. For example, the first index may include 14 bits, and the first index indicates whether the following 14 fields are compressed through the 14 bits:

a destination address field;
a source address field;
a type field;
a length field;
a virtual local area network (VLAN) field or a Q-tag;
a C-tag;
an S-tag;
a tag protocol ID (TPID);
a virtual local area network ID (VID);
a priority code point (PCP);
a drop eligible indicator (DEI);
a data field;
padding bits;
cyclic redundancy check (CRC).

For example, 1 indicates compression, and 0 indicates no compression. For example, 10000000000000 can indicate that the destination address field is compressed, and other fields are not compressed.

Optionally, the compression device sends the first index to the decompression device. The decompression device receives the first index sent by the compression device.

Optionally, the first data packet or the second data packet includes the first index.

For the decompression device, the decompression end can determine whether to decompress or recover the padding bits based on the first index, or the decompression device can successfully decompress or recover the padding bits based on the first index when determining that the padding bits are decompressed or recovered.

Optionally, the decompression device determines the compression parameter.

Optionally, the decompression device receives the compression parameter sent by an access network device, a core network device or other devices.

Optionally, the compression parameter includes the first index.

Optionally, the decompression device determines whether to decompress or recover the received target data packet based on the first index.

Optionally, the decompression device determines that the target data packet does not need to be decompressed or recovered based on the first index.

Optionally, when the first index is used to indicate that the Ethernet frame data packet is not compressed, the decompression device does not need to decompress or recover the target data packet, or the decompression device determines that the target data packet does not need to be decompressed or recovered.

Optionally, the decompression device determines to decompress or recover the target data packet based on the first index.

Optionally, the decompression device determines the first compression object according to the first index. That is, after receiving the first index, the decompression device can determine the compression object in the target data packet based on the first index, and then decompress or restore the compression object in the target data packet.

Optionally, the decompression device decompresses or recovers the first compression object in the target data packet.

Optionally, the decompression device determines the first compression object corresponding to the first index according to the first index and the first corresponding relationship, the first corresponding relationship including at least one compression object and an index corresponding to the at least one compression object, and the at least one compression object including the first compression object.

Mode 2:

Optionally, the compression parameter includes first indication information, which is used to indicate a compression object or a non-compression object in the Ethernet frame data packet.

Optionally, the first indication information is specifically used to indicate that the non-compression object in the Ethernet frame data packet includes at least one of:

a destination address field, a source address field, a type field, a length field, a virtual local area network (V LAN) field, a Q-tag, a C-tag, an S-tag, a TPID, a VID, a PCP, a DEI and padding bits in a data field.

Optionally, the first indication information is specifically used to indicate that the compression object in the Ethernet frame data packet includes at least one of:

a destination address field, a source address field, a type field, a length field, a virtual local area network (VLAN) field, a Q-tag, a C-tag, an S-tag, a TPID, a VIII, a PCP, a DEI and padding bits in a data field.

Optionally, the first indication information is specifically used to indicate that the non-compression object in the Ethernet frame data packet also include at least one of the following: a Logical Link Control (LLC) header, a SubNetwork Access Protocol (SNAP) header, each sub-header in the LLC header and each sub-header in the SNAP header.

Optionally, the first indication information is specifically used to indicate that the compression object in the Ethernet frame data packet further includes at least one of: a Logical Link Control (LLC) header, a SubNetwork Access Protocol (SNAP) header, each sub-header in the LLC header and each sub-header in the SNAP header. Optionally, the first indication information is used to indicate whether the compression object in the Ethernet frame data packet includes the padding bits in the data field, or the first indication information is used to indicate whether the Ethernet frame data packet includes the padding bits, or the first indication information is used to indicate whether the Ethernet frame data packet includes the processed padding bits.

Optionally, the compression device sends the first indication information to the decompression device. The decompression device receives the first indication information sent by the compression device. Or the decompression device receives the first indication information sent by a header compression configuration device, such as a core network device.

Optionally, the first data packet or the second data packet includes the first indication information.

Optionally, the first indication information includes at least one bit.

For example, the first data packet or the second data packet includes at least one bit used for indicating whether at least one field has been processed or included. The at least one bit corresponds to at least one field. For example, for each compression and/or non-compression object, one bit is used to indicate whether the field is contained or compressed. For example, a value of 1 indicates compression, and a value of 0 indicates no compression. For example, the value of 1 indicates that the field is compressed, and the value of 0 indicates that the field is not compressed; and the value of 1 indicates that the field is contained, and the value of 0 indicates the field is not contained, i.e, it is processed. As another example, for at least one of combinations of at least one of the compression and/or non-compression objects, one hit is used to indicate whether the field is contained or processed. For example, the value of 1 indicates that the source address field and the destination address field are compressed, and the value of 0 indicates that the source address field and the destination address field are not compressed; and the value of 1 indicates that the source address field and the destination address field are contained, and the value of 0 indicates that the source address and destination address fields are not contained, i.e., they are processed.

As another example, the first data packet or the second data packet includes one bit used for indicating whether at least one field has been processed or included. The bit corresponds to at least one field. That is, whether at least one field is contained or compressed is indicated by one bit. For example, the value of 1 indicates compression, and the value of 0 indicates no compression. For example, the value of 1 indicates the field has been compressed, and the value of 0 indicated the field is not compressed; and the value of 1 indicates the field is contained, and the value of 0 indicates the field is not included, i.e., it is processed. For the decompression device, the decompression end can determine whether to decompress or recover the padding bits based on the first indication information, or the decompression device can successfully decompress or recover the padding hits based on the first indication information when determining to decompress or recover the padding bits.

Optionally, the decompression device determines the compression parameter.

Optionally, the decompression device receives the compression parameter sent by an access network device, a core network device or other devices.

Optionally, the compression parameter includes the first indication information.

Optionally, the decompression device determines whether to decompress or recover the received target data packet based on the first indication information.

Optionally, the decompression device determines that the target data packet does not need to be decompressed or recovered based on the first indication information.

Optionally, the first indication information is used to indicate that when the Ethernet frame data packet is not compressed, the decompression device does not need to decompress or recover the target data packet, or the decompression device determines that the target data packet does not need to be decompressed or recovered.

Optionally, the decompression device determines the target data packet is decompressed or recovered based on the first indication information.

Optionally, the decompression device determines the first compression object according to the first indication information. That is, after receiving the first indication information, the decompression device can decompress or recover the compressed compression object in the target data packet indicated by the first indication information.

Optionally, the decompression device decompresses or recovers the first compression object in the target data packet.

FIG. 5 is a schematic flowchart of a wireless communication method 220 according to an implementation of the present disclosure. It should be understood that the method 220 is described by taking uplink transmission as an example, but the implementations of the present disclosure are not limited thereto.

Referring to FIG. 5, the method 220 may include the following steps.

In S221, a network device configures a compression parameter for an Ethernet frame.

In S222, the network device sends the compression parameter to a terminal device.

In S223, the terminal device determines whether to compress a first data packet according to the compression parameter.

In S224, the terminal device sends the first data packet.

In S225, the terminal device compresses the first data packet according to the compression parameter to obtain a second data packet.

In S226, the terminal device sends the second data packet to the network device.

In S227, the network device decompresses the second data packet.

The terminal device receives the compression parameter to determine whether to compress the first data packet, or the terminal device determines when to send the compressed second data packet. For example, the terminal device determines that header compression will be performed according to the compression parameter, and compresses a CIS-tag, an Ethernet header and a padding field. The terminal device performs header compression on a VLAN field, a destination address field, a source address field, a type/length field and a padding field of an Ethernet packet according to the compression parameter, and generates and sends the second data packet.

Optionally, the terminal device sends X uncompressed data packets (X can be network-configured), and then sends the compressed Ethernet data packets; and/or, the terminal device receives V uncompressed feedback packets representing ACK (Y can be network-configured), and then sends the compressed Ethernet data packets.

The network device receives the Ethernet data packets from the terminal device, and determines whether and when to perform decompression.

Optionally, the network device, as a decompression device, can send header-compressed feedback packets under certain conditions.

Optionally, after receiving the X uncompressed data packets sent by the terminal device (X can be network-configured), the network device decompresses the subsequently received data packets; and/or, after sending the Y uncompressed feedback packets representing ACK (Y can be network-configured), the network device decompresses the subsequently received data packets. For example, after the network device determines that header decompression will be performed and/or which information fields will be decompressed, the network device decompresses the subsequently received data packets after receiving the X uncompressed data packets sent by the terminal device (X can be network-configured); and/or, after sending the Y uncompressed feedback packets representing ACK (Y can be network-configured), the network device decompresses the subsequently received data packets.

Implementation Two

Optionally, the compression device determines whether to compress or drop padding bits in a data field of the first data packet.

Optionally, as described above, when a first condition is met, the compression device compresses or removes the padding bits.

At this time, the decompression device may determine whether to decompress or recover the padding bits according to the compression parameter, and/or the decompression device may determine how the padding bits are decompressed or recovered.

Optionally, the decompression device may also determine whether to decompress or recover the padding bits according to the compression parameter and information carried in the first data packet/second data packet (such as padding related indication information and indication information of other fields), and/or the decompression device may determine how to decompress or recover the padding bits. Specifically, whether to decompress or recover the padding bits is determined according to the compression parameter and/or indication information of compression of the padding field in the data packet. As another example, whether to decompress or recover the padding bits is determined according to the compression parameter and/or indication information of whether the length field in the data packet is compressed. As another example, whether to decompress or recover the padding bits is determined according to the compression parameter and/or information of the length field in the data packet. It should be noted that the above methods can be used separately or in combination.

In air interface transmission, transmission efficiency is very important. Because the padding bits are only space-occupying padding bits and there is no specific data information, if the padding field is not compressed but is transmitted directly at the air interface, the loss of air interface resources will be increased and the utilization rate of the air interface resources will be decreased. Therefore, there is a problem of how to compress (remove) and decompress (recover) the padding field.

Transmission of Ethernet frames can be implemented based on the scheme of Implementation one.

In other words, the technical scheme of Implementation one can solve the following technical problems:

The compression device determines whether to compress Ethernet packets (including the padding bits).

The compression device determines a compression object in an Ethernet frame data packet.

Compression and transmission of the padding bits in the first data packet can be implemented based on the scheme of Implementation two.

In other words, the technical scheme of implementation two can solve the following technical problems:

The compression device can determine whether to compress or remove the padding bits in the first data packet.

When the compression device compresses the padding bits is determined.

How the compression device compresses the padding bits is determined. (For example, when the compression device determines that the padding bits are determined, the padding bits are removed from the data packet, and/or corresponding indication information is added to the data packet.)

That is, the technical scheme of Implementation two can enable the compression device to compress the padding bits, and enable the decompression device to decompress or recover the padding hits in the target data packet.

A first network entity configures the compression parameter of the Ethernet frame data packet.

Optionally, the compression parameter indicates whether the padding bits are compressed.

The first network device may be a network device, or a core network, or other devices. When the first network entity is the core network, compression parameter information needs to be indicated to the terminal device and the network device. Otherwise, compression parameter information only needs to be indicated to the terminal device.

Optionally, when the first condition is met, the compression device compresses or drops the padding bits in the data field of the first data packet.

Optionally, when the first condition is met, the compression device may also add corresponding indication information to the data packet, and the indication information may be at least one of indication information of 1 bit of compression or removal of the padding field, information of the number of bytes of the padding field, and information of whether the length field is compressed.

For example, the compression device compresses or drops the padding bits in the first data packet when the compression parameter indicates that the Ethernet frame data packet is compressed and the first condition is met, and/or the compression device adds the corresponding indication information to the data packet when the compression parameter indicates that the Ethernet frame data packet is compressed and the first condition is met.

Optionally, the first condition includes at least one of:

that the frame format of the Ethernet frame is an 802.3 format;

that the type/length field of the Ethernet frame represents a length field;

that a value of the type/length field of the Ethernet frame is less than a first threshold;

compression of the padding bits is configured by access network or core network or predefined;

that the decompression device has an ability to decompress or recover the padding bits;

that the compression device has sent X uncompressed data packets;

that the compression device has received Y header-compressed feedback packets representing acknowledgement (ACK);

that the compression device has an ability to compress the padding bits;

that indication information of compression or dropping of the padding bits by the decompression device is received;

that the length field is compressed or needs to be compressed; and that the length field is not compressed.

Optionally, the decompression device having the ability to decompress or recover the padding bits means that the decompression device satisfies at least one of:

that the decompressing device indicates that the decompressing device has the ability to decompress or recover the padding bits;

that the decompression device has the ability to recover the padding bits based on decoding of information of a data part;

that the decompression device has an ability to deeply decode the information of the data part; and that the decompression device can recover the padding bits according to a lower layer data packet.

Taking the case where the compression end is the terminal as an example, the terminal device determines that the first condition is met, and removes or compresses the padding bits. The data packet with the padding bits removed or compressed is sent to an entity on the opposite end. Optionally, the terminal device adds the corresponding indication information to the data packet, and the indication information may be at least one of indication information of 1 bit of compression or removal of the padding field, information of the number of bytes of the padding field, and information of whether the length field is compressed. Optionally, the terminal device sends the X uncompressed data packets (X can be network-configured), and then sends the Ethernet data packets with the padding field compressed; and/or, the terminal device receives the Y uncompressed feedback packets representing ACK (Y can be network-configured), and then sends the Ethernet data packets with the padding field compressed. The network device receives the Ethernet data packets from the terminal device, and determines whether and when to perform decompression.

Optionally, the compression device sends second indication information, which is used to indicate the size of the padding bits in the data packet or the size of the padding bits, before compressed, in the data packet. Therefore, the decompression end can determine whether to decompress or recover the padding bits, or the decompression device can successfully decompress or recover the padding bits when determining that the padding bits are decompressed or recovered.

Optionally, the first data packet or the second data packet includes the second indication information.

Optionally, the compression device sends third indication information, which is used to indicate whether the Ethernet frame data packet includes the padding bits or whether the Ethernet frame data packet includes the compressed padding bits. Therefore, the decompression end can determine whether to decompressed or recover the padding bits, or the decompression device can successfully decompress or recover the padding bits when determining that the padding bits are decompressed or recovered.

Optionally, the first data packet or the second data packet includes the third indication information.

Optionally, the compression device sends a length field indication to determine the number of bytes of the padding bits in the target data packet and/or information of the length field in the target data packet. Optionally, the length field indication can be directly used to indicate the information of the length field, e.g., the number of bytes in the length field. Optionally, the length field indication can be used to indicate whether the length field is contained or compressed. Therefore, the decompression end can determine whether to decompressed or recover the padding bits, or the decompression device can successfully decompress or recover the padding bits when determining that the padding bits are decompressed or recovered.

Optionally, the target data packet includes the length field indication.

Optionally, the lower layer data packet of the target data packet includes the length field indication.

The lower layer data packet includes, but is not limited to, a radio link control (RLC) packet, a media access control (MAC) packet and a packet data convergence protocol (PDCP) packet.

The lower layer data packet includes, but is not limited to, an RLC Protocol Data Unit (PDU), an RLC SDU and a PDCP PDU, an MAC SDU and an MAC PDU.

Optionally, the compression device determines whether to compress or remove the padding bits in the target data packet.

Optionally, the compression device determines when to compress or remove the padding bits in the target data packet.

Optionally, the compression device determines whether the target data packet includes the padding bits.

Optionally, the compression device determines whether the target data packet includes the corresponding indication information.

Optionally, the compression device determines whether the length of the padding bits is changed.

An implementation in which the compression device compresses the padding bits in the first data packet has been described above, and an implementation in which the decompression device decompresses the padding bits in the target data packet will be described below.

Optionally, the decompression device determines a compression object or a decompression object in the target data packet.

Optionally, the compression object or decompression object includes at least one of:

a destination address field, a source address field, a type field, a length field, a virtual local area network VLAN field, Q-tags, C-tags, S-tags, TPID, VID, PCP, DEI and padding bits in a data field.

Optionally, the compression object or decompression object also includes at least one of: a Logical Link Control (LLC) header, a SubNetwork Access Protocol (SNAP) header, each sub-header in the LLC header and each sub-header in the SNAP header.

Optionally, the decompression device determines whether to decompress or recover the padding bits in the target data packet.

Optionally, the decompression device determines whether the padding bits in the target data packet have been compressed or removed.

Optionally, the decompression device determines whether the target data packet includes the padding bits.

Optionally, the decompression device determines whether the length of the padding bits in the target data packet is changed.

Optionally, the decompression device adds a 0- or 1-bit string or a specific bit string with the same number of bytes as the padding bits behind valid data of the data field or Ethernet frame in the target data packet to obtain the decompressed or final data field.

Optionally, the decompression device determines the number of bytes of the padding bits.

It should be noted that no matter whether the frame format is an Ethernet II frame format or an 802.3 frame format, the minimum length of a data field excluding an Ethernet header and a cyclic redundancy check (CRC) field is 46 bytes, that is, the total size of an Ethernet packet is at least 64 bytes. When the size of actual data of the data field is less than 46 bytes, padding bits need to be added to the actual data to ensure that its size is at least 46 bytes. However, transmission of the padding bits at the air interface will increase the loss of air interface resources and reduce the utilization rate of the air interface resources.

Therefore, in one implementation, the compression device can directly indicate information of the padding bits in the target data packet of the decompression device, such as the size of the padding bits in the target data packet, the size of the padding bits, before compressed, in the target data packet, whether the padding bits are compressed, or whether the target data packet includes the padding bits. In another implementation, the decompression device may determine the information of the padding bits based on information of the length field or information of the type field.

Optionally, the decompression device determines the number of bytes of the padding bits according to information of the length field in the target data packet.

For example, the length field is included in the target data packet or the length field in the target data packet is not compressed, at which point the decompression device can determine information of the padding field according to the information of the length field.

Optionally, the decompression device subtracts the number of bytes of the length field from 46 bytes to obtain the number of bytes of the padding bits.

For example, assuming that the length field is carried in the target data packet, when the value of the length field is less than 46 bytes, such as 38 bytes, the size of the padding field is a value of 46-length, that is, 46−38=8 bytes. The decompression device adds padding bits of 8 bytes, such as an all-0-bit string of 8 bytes, behind valid data in the data part of the Ethernet frame.

As another example, assuming that indication information of 1 bit of whether the length field is compressed is carried in the target data packet.

As another example, assume that the length field is carried in the target data packet, which may include information of bytes of the length field.

As another example, assuming that the length field is carried in the target data packet and the compression device compresses the padding field. When the value of the length field is less than 46 bytes, such as 38 bytes, the size of the padding field is a value of 46-length, that is, 46−38=8 bytes. The decompression device adds padding bits of 8 bytes, such as an all-0-bit string of 8 bytes, behind valid data in the data part of the Ethernet frame.

Optionally, the decompression device determines the number of bytes of the padding bits in the target data packet and/or the information of the length field in the target data packet according to the length field indication. Optionally, the length field indication can be directly used to indicate the information of the length field, e.g., the number of bytes of the length field.

Optionally, the target data packet includes the length field indication.

Optionally, the lower layer data packet of the target data packet includes length field indication of an upper data packet. For example, the RLC PDU contains length information of the PDCP SDU contained in the lower layer data packet. The PDCP SDU can correspond to an Ethernet frame data packet. The length of the Ethernet frame data packet is determined according to the length indication contained in the RLC PDU. The length of the data part is determined according to the length of the Ethernet frame data packet minus the size of other headers of the data part, and then the number of bytes of the length field of the Ethernet frame is determined. Optionally, in this case, the padding bits are compressed or removed.

The lower layer data packet includes, but is not limited to, a radio link control (RLC) packet, a media access control (MAC) packet and a packet data convergence protocol (PDCP) packet.

The lower layer data packet includes, but is not limited to, an RLC Protocol Data Unit (PDU), an RLC SDU, an MAC PDU, an MAC SDU and a PDCP PDU.

Optionally, if the length field is compressed, the padding bits are compressed or removed.

Optionally, if the length field is not compressed, the padding bits may be compressed or removed, or may not be compressed.

Optionally, the decompression device receives second indication information, which is used to indicate the size of the padding bits of the target data packet or the size of the padding bits, before compressed.

Optionally, the decompression end decompresses or recovers the padding hits in the target data packet according to the second indication information.

Optionally, the target data packet includes the second indication information.

Optionally, the compression device sends third indication information, which is used to indicate whether the Ethernet frame data packet includes the padding bits or whether the Ethernet frame data packet includes the compressed padding bits. In other words, the decompression device receives the third indication information.

Optionally, the decompression end decompresses or recovers the padding hits in the target data packet according to the third indication information.

Optionally, the target data packet includes the third indication information.

For example, if the size of the Padding field is the number of bytes of the Padding field, the decompression device can directly add a 0- or 1-bit string with the same number of bytes as the padding field behind valid data of the data field or Ethernet frame in the target data packet according to the size of the padding field to obtain the decompressed or final data field.

As another example, the decompression device receives an indication of whether the padding field is compressed sent by the compression device, for example, indication information of 1 bit is introduced to indicate whether the padding field is compressed. Optionally, the target data packet may include the indication of whether the padding field is compressed.

As another example, the decompression device receives information of bytes/length occupied by the padding field sent by the compression device, for example, indication information of 4 bits is introduced to indicate the information of bytes occupied by the padding field for recovering the padding bits.

As another example, the indication of whether the padding field is compressed is carried in the compressed packet. If the indication is 1, indicating that the padding field is compressed, then the decompression device will determine the size of the padding bits according to information of the valid data carried in the data part or information of the valid data decoded from the data part. The decompression device adds padding bits of corresponding bytes, such as an all-0-bit string of 8 bytes, behind the valid data of the data part in the Ethernet frame.

As another example, the indication of whether the padding field is compressed (the indication is 1, indicating that the padding field is compressed) and the information of bytes/length occupied by the padding field (e.g., the information indicates that the padding field occupies 8 bytes) are carried in the compressed packet. The decompression device adds padding bits of 8 bytes, such as an all-0-bit string of 8 bytes, behind the valid data of the data part in the Ethernet frame.

Optionally, the decompression end decompresses or recovers the padding bits in the target data packet according to the information of the length field.

Optionally, the target data packet includes the information of the length field.

An implementation in which the device at the decompressing end decompresses or recovers the padding bits has been described above, and an implementation in which the decompressing end decompresses the length field or type field will be described below. It should be understood that similar to the implementation in which the decompressing end decompresses the length field or type field, the implementation in which the decompressing end decompresses the length field will be described below by way of example.

Optionally, the compression device determines whether to compress the length field in the first data packet.

Optionally, when the padding bits in the data field of the first data packet are compressed or removed, the compression device compresses the length field; and/or when the padding bits in the data field of the first data packet are not compressed or removed, the compression device does not compress the length field.

Optionally, when the padding bits in the data field of the first data packet are compressed or removed, the length field may or may not be compressed.

Optionally, the first data packet or the second data packet includes the length field.

Optionally, the compression device determines time when the second data packet is sent.

Optionally, the decompression device determines whether to decompress the length field in the target data packet.

Optionally, the decompression device determines whether to decompress the length field in the target data packet according to whether the padding bits in the target data packet have been compressed or need to be decompressed.

Optionally, when the padding bits in the target data packet have been compressed or removed, the length field in the target data packet is decompressed or recovered. Optionally, when the padding bits in the target data packet are not compressed or removed, the length field in the target data packet is not decompressed or recovered.

Optionally, the decompression device determines whether the length field in the target data packet has been compressed.

Optionally, the decompression device determines whether the target data packet includes the length field.

Optionally, the decompression device determines that the length field in the target data packet does not need to be decompressed or recovered.

Optionally, the decompression device determines that the length field in the target data packet is not compressed or the target data packet includes the length field. That is, the decompression device does not need to decompress the length field in the target data packet.

Optionally, the decompression device determines the number of bytes in the length field according to the size of the padding bits in the target data packet.

Optionally, the decompression device determines the number of bytes in the length field according to the size of the padding bits, before compressed, in the target data packet.

Optionally, the size of the padding bits is the number of bytes of the padding bits.

Optionally, the decompression device subtracts the number of bytes of the padding bits from 46 bytes to obtain the number of bytes of the length field.

Optionally, the decompression device determines the number of bytes of padding bits in the target data packet and/or the information of the length field in the target data packet according to the length field indication. Optionally, the length field indication can be directly used to indicate the information of the length field, e.g., the number of bytes in the length field.

Optionally, the target data packet includes the length field indication.

Optionally, the lower layer data packet of the target data packet includes length field indication of an upper data packet. For example, the RLC PDU contains length information of the PDCP SDU contained in the lower layer data packet. The PDCP SDU can correspond to an Ethernet frame data packet. The length of the Ethernet frame data packet is determined according to the length indication contained in the RLC PDU. The length of the data part is determined according to the length of the Ethernet frame data packet minus the size of other headers of the data part, and then the number of bytes of the length field of the Ethernet frame is determined. Optionally, in this case, the padding bits are compressed or removed.

The lower layer data packet includes, but is not limited to, a radio link control (RLC) packet, a media access control (MAC) packet and a packet data convergence protocol (PDCP) packet.

The lower layer data packet includes, but is not limited to, an RLC Protocol Data Unit (PDU), an RLC SDU, an MAC PDU, an MAC SDU and a PDCP PDU.

Optionally, when the Ethernet frame is an 802.3 frame or Ether Type represents Length, the decompression end may fill in the value corresponding to the compressed length field according to padding information. For example, when the size the padding field is determined to be 8 bytes, the value of the length field is determined to be 46−8=38 bytes. 38 bytes will be filled into the value of the length field.

Optionally, the decompression device determines whether to decompress the type field in the target data packet.

It should be understood that an implementation in which the decompression device determines Whether to decompress the type field in the target data packet is similar to the implementation in which the decompression device determines whether to decompress the length field in the target data packet, and will not be repeated herein in order to avoid redundancy.

Optionally, when a second condition is met, the decompression device decompresses or recovers the padding bits in the target data packet.

Optionally, the second condition includes at least one of:
that the frame format of the Ethernet frame is an 802.3 format;
that the type/length field of the Ethernet frame represents information of the length field;
that the value of the type/length field of the Ethernet frame is less than a first threshold;
compression of the padding bits is configured by access network or core network or predefined;
that the decompression device has an ability to decompress or recover the padding bits; that header compression is not performed on the length field in the data packet;
that the Ethernet frame data packet is less than 64 bytes;
that a data part of the Ethernet frame data packet is less than 46 bytes;
that the decompressed Ethernet frame data packet is less than 64 bytes;
that a data part of the decompressed Ethernet frame data packet is less than 46 bytes;
that an indication whether the padding bits have been compressed is received;
that an indication of the length occupied by the padding bits is received;

that a padding bit compression indication is received;
that the compression device has sent X uncompressed data packets;
that the compression device has received Y header compressed feedback packets representing acknowledgement (ACK);
that the compression device has an ability to compress the padding bits;
that the padding bits are compressed or removed;
that the length field is compressed;
that an indication of an ability of the compression device to compress the padding bits is received; and
that the length field is not compressed or the length field is included in the data packet.

Optionally, the decompression device having the ability to decompress or recover the padding bits means that the decompression device satisfies at least one of:
that the decompressing device indicates that the decompressing device has the ability to decompress or recover the padding bits;
that the decompression device has the ability to recover the padding bits based on decoding of information of the data part;
that the decompression device has an ability to deeply decode the information of the data part; and
that the decompression device can recover the padding bits according to a lower layer data packet.

Taking the uplink transmission as an example, the network device determines that the second condition is met, the decompression end determines whether the padding field in the target data packet has been compressed or removed, and/or the decompression end determines whether to decompress or recover the padding field. The decompression end determines that the padding field is decompressed or recovered, and then delivers the Ethernet data packets with the padding field recovered to a higher layer.

Optionally, the network device, as a decompression device, can send feedback packets of the uncompressed data packets under certain conditions.

For example, after receiving the X uncompressed data packets (X can be network-configured), the network device recovers the padding field in the subsequent data packets; and/or the network device recovers the padding field in the subsequent data packets after sending the Y uncompressed feedback packets representing ACK (Y can be network-configured).

Implementation Three

In the implementation, information carried by the first data packet or the second data packet is designed such that the transmission of the Ethernet frames can be implemented.

Specifically, information that may be carried in the uncompressed Ethernet packets and the compressed Ethernet packets and/or packet formats of the uncompressed Ethernet packets and the compressed Ethernet packets are designed.

The first network entity configures a compression parameter of the Ethernet. Optionally, the compression parameter indicates whether the padding bits are compressed. Optionally, it is indicated whether the PCP and/or DEI in the VLAN field is compressed. The first network device may be a network device, a core network, or other devices.

Taking the uplink transmission as an example, the terminal device receives the compression parameter and determines whether header compression is performed or when the compressed data packets will be sent. Specifically, the terminal device first sends the uncompressed data packets, and then sends the compressed data packets. For example, after sending the X uncompressed data packets (X can be network-configured), the terminal device sends the Ethernet data packets with the padding field compressed.

Optionally, the first data packet or the second data packet includes at least one of:
a destination address field;
a source address field;
a type field;
a length field;
a virtual local area network (VLAN) field or a Q-tag;
a C-tag;
an S-tag;
a tag protocol ID (TPID);
a virtual local area network ID (VID);
a priority code point (PCP);
a drop eligible indicator (DEI);
a data field;
padding bits;
cyclic redundancy check (CRC);
a packet indication fir indicating that the current data packet is a feedback packet or a data packet;
a first variable field indication used to indicate whether a variable field part of the Ethernet frame data packet has been compressed, or whether the variable field part of the Ethernet frame data packet is changed, or whether the variable field part of the Ethernet frame data packet is contained. For example, the first variable field indication is used to indicate whether the variable field part of the Ethernet frame data packet including the padding bits has been compressed, or whether the variable field part of the Ethernet frame data packet including the padding bits is changed, or whether the Ethernet frame data packet including the padding bits contains the variable field part of the Ethernet frame data packet;
a second variable field indication used to indicate whether a variable field part of a frame header of the Ethernet frame data packet has been compressed, or whether the variable field part is contained in the Ethernet frame data packet, or whether the variable field part of the frame header of the Ethernet frame data packet is changed. For example, the second variable field indication is used to indicate whether the variable field part of the Ethernet frame data packet excluding the padding bits has been compressed, or whether the Ethernet frame data packet excluding the padding bits contains the variable field part, or whether the variable field part of the Ethernet frame data packet excluding the padding bits is changed;
a Q-tag variable field indication used to indicate whether a variable field part in the Q-tag has been compressed, or whether the data packet contains the variable field part, or whether the variable field part is changed, or whether the variable field part is compressed;
a C-tag variable field indication used to indicate whether a variable field part in the C-tag has been compressed, or whether the data packet contains the variable field part, or whether the variable field part is changed, or whether the variable field part is compressed;
an S-tag variable field indication used to indicate whether a variable field part in the S-tag has been compressed, or whether the data packet contains the variable field part, or whether the variable field part is changed, or whether the variable field part is compressed;
a padding bit size indication for indicating the size of the padding bits of the current data packet;
a padding bit compression indication used to indicate whether the padding bits are compressed, or whether the padding bits of the current data packet have been compressed, or whether the current data packet contains the padding bits, or whether the length of the padding bits is changed;
a sub-path ID used to identify a context index or identifier that can be mapped to different data packets of the header compression configuration or object;
a packet compression indication used to indicate whether the current data packet is a compressed data packet or an uncompressed data packet;
a header compression indication used to indicate compressed sub-header information of the current data packet;
a virtual local area network (VLAN) compression indication used to indicate whether the Q-tag has been compressed or the S-tag and/or the C-tag or at least portion thereof has been compressed, or whether the Q-tag is contained or the S-tag and/or the C-tag or at least portion thereof has been compressed, or whether the Q-tag has been compressed or the S-tag and/or the C-tag or at least portion thereof is changed;
a length field indication used to indicate whether the length field has been compressed, or whether the length field is contained, or whether the length field is changed; and
a type field indication used to indicate whether the type field has been compressed, or whether the type field is contained, or whether the type field is changed.

It should be noted that the VLAN field can be at least one of a T-tag, an S-tag and a C-tag.

In the implementation, the target data packet received by the decompression end may be a compressed or uncompressed data packet, and indication information may also carried in the target data packet, the indication information is used for indicating whether various fields or information in the target data packet have been compressed or indicating information of the compressed fields.

The format of the data packet in the implementations of the present disclosure will be described exemplarily in combination with FIGS. 6 to 18. For convenience of explanation, physical meanings of letters involved in FIGS. 6 to 18 will be described below.

D/C is a packet indication, which is used to indicate that the current data packet is a feedback packet or a data packet. For example, D=1 indicates the data packet and C=0 indicates the feedback packet.

Q is a Q-tag variable field indication, which is used to indicate whether a variable field part in the Q-tag has been compressed, or whether the variable field part is included in the data packet, or whether the variable field part is changed, or whether the variable field part is compressed. It is indicated whether the variable field part is contained.

For example, changing of a value means that the variable field part is contained. As another example, changing of the value means that the variable field part has been compressed. As another example, a value of 1 indicates compression, and a value of 0 indicates no compression.

F is a packet compression indication, which is used to indicate whether the current data packet is a compressed data packet or an uncompressed data packet.

For example, the value of the compressed package is 1, and the value of the uncompressed package is 0.

First information is a header compression indication, which is used to indicate compressed sub-header information of the current data packet. For example, it is indicated whether header compression is performed. As another example, the sub-header information (or mapping relationship) has been compressed. The first information may be a first index, first indication information, etc.

A padding bit size indication is used to indicate the size of the padding bits (padding size) of the current data packet.

P is a padding bit compression indication, which is used to indicate whether the padding hits are compressed, or whether the padding bits of the current data packet have been compressed, or whether the current data packet contains the padding bits, or whether the length of the padding bits is changed.

CRC is check bits, which can occupy 3-8 bits. For example, the CRC can occupy 4 bits.

A sub-path ID is used to identify a context index or identifier that can be mapped to different data packets of the head compression configuration or object.

Optionally, the sub-path ID can occupy 1-5 bits. For example, the sub-path ID can occupy 4 bits.

V is a VLAN compression indication, which is used to indicate whether the Q-tag has been compressed or the S-tag and/or the C-tag or at least portion thereof has been compressed, or whether the Q-tag is contained or the S-tag and/or the C-tag or at least portion thereof has been compressed, or whether the Q-tag has been compressed or the S-tag and/or the C-tag or at least portion thereof is changed. In other words, the VLAN compression indication is used to indicate whether the VLAN field/Q-tag has been compressed, or to indicate whether the VLAN field has been compressed (to indicate whether a V field of 1-bit has been compressed, the V field being extended to a S field of 1 bit+a C field of 1 bit, to indicate whether a service tag (S-tag) field and a user tag (C-tag) field have been compressed, or to indicate whether the current data packet contains the service tag (S-tag) field and the user tag (C-tag) field).

L is a length field indication, which is used to indicate whether the length field has been compressed, or whether the length field is contained, or whether the length field is changed. L is the length field indication that can occupy 1 bit. Optionally, when the bit appears or its value is 1 (the table is changed or contained), the length field is carried in the compressed packet.

T is a type field indication, which is used to indicate whether the type field has been compressed, or whether the type field is contained, or whether the type field is changed. T is the type field indication that can occupy 1 bit. Optionally, when the bit appears or its value is 1 (the table is changed or contained), the type field is carried in the compressed packet.

L/T is a length field/type field indication, which is used to indicate whether the length field/type field has been compressed, or whether the length field/type field is contained, or whether the length field/type field is changed.

F1 is a feedback packet indication.

F2 is a compressed packet indication, that is, an indication of a format of the first data packet or the second data packet, wherein the format of the first data packet is different from the format of the second data packet.

A/N indicates acknowledgement/non-acknowledgement.

R is a reserved value.

Figure 6:
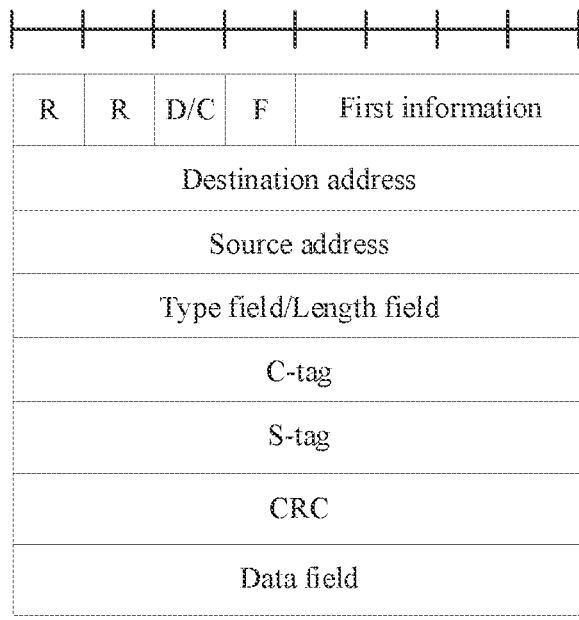
FIG. 6 is a schematic structural diagram of a data packet in accordance with implementations of the present disclosure.

Referring to FIG. 6, the data packet may include:

R, R, D/C, F, first information, a destination address, a source address, a type field/length field, a C-tag, an S-tag, CRC and a data field.

Figure 7:
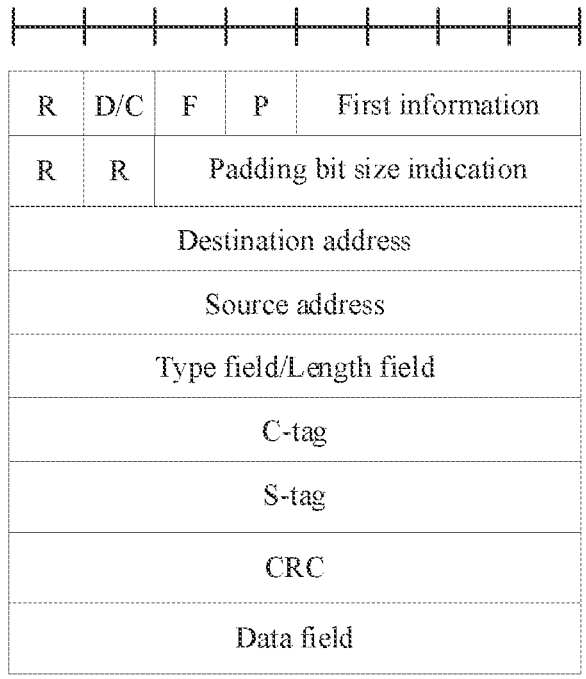
FIG. 7 is a schematic structural diagram of a data packet in accordance with implementations of the present disclosure.

Referring to FIG. 7, the data packet may include:

R, R, R, D/C, F, P, first information, a padding bit size indication, a destination address, a source address, a type field/length field, a C-tag, an S-tag, CRC and a data field.

Figure 8:
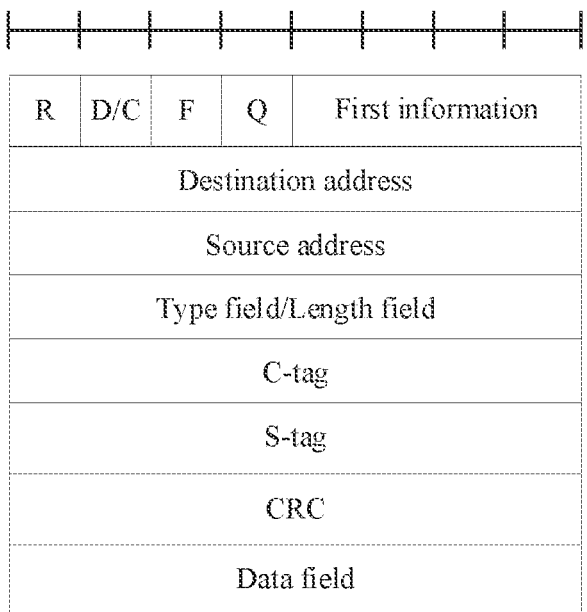
FIG. 8 is a schematic structural diagram of a data packet in accordance with implementations of the present disclosure.

Referring to FIG. 8, the data packet may include:

R, D/C, F, Q, first information, a destination address, a source address, a type field/length field, a C-tag, an S-tag, CRC and a data field.

Figure 9:
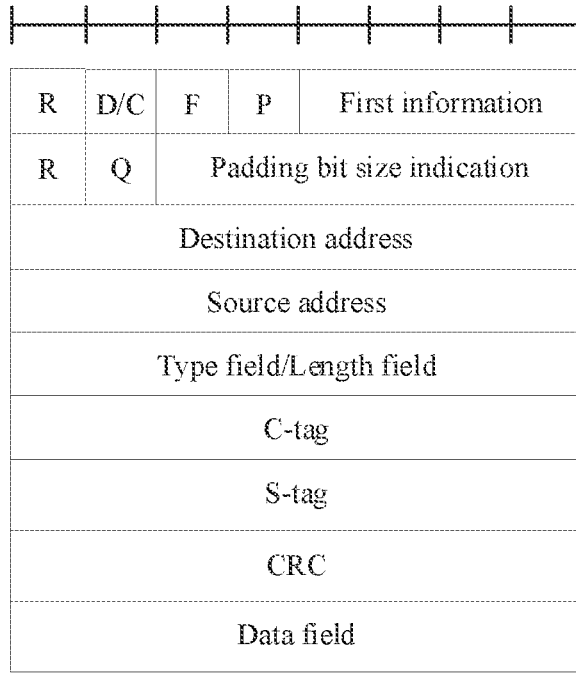
FIG. 9 is a schematic structural diagram of a data packet in accordance with implementations of the present disclosure.

Referring to FIG. 9, the data packet may include:

R, R, D/C, F, P, Q, first information, a padding bit size indication, a destination address, a source address, a type field/length field, a C-tag, an S-tag, CRC and a data field.

Figure 10:
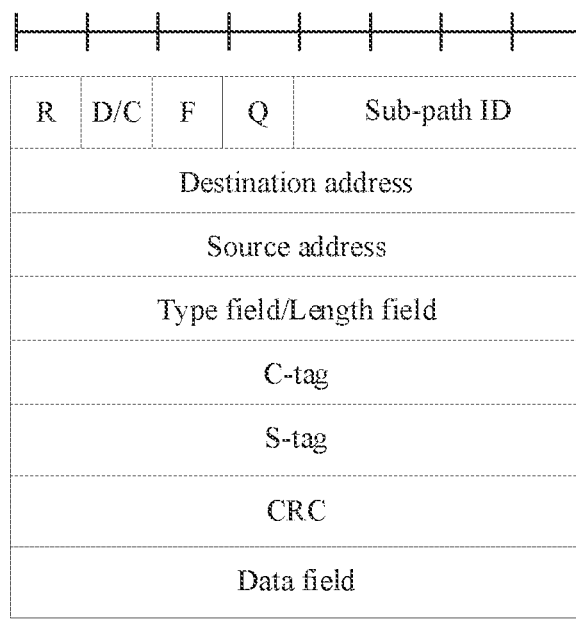
FIG. 10 is a schematic structural diagram of a data packet in accordance with implementations of the present disclosure.

Referring to FIG. 10, the data packet may include:

R, D/C, F, Q, a sub-path ID, a destination address, a source address, a type field/length field, a C-tag, an S-tag, CRC and a data field.

Figure 11:
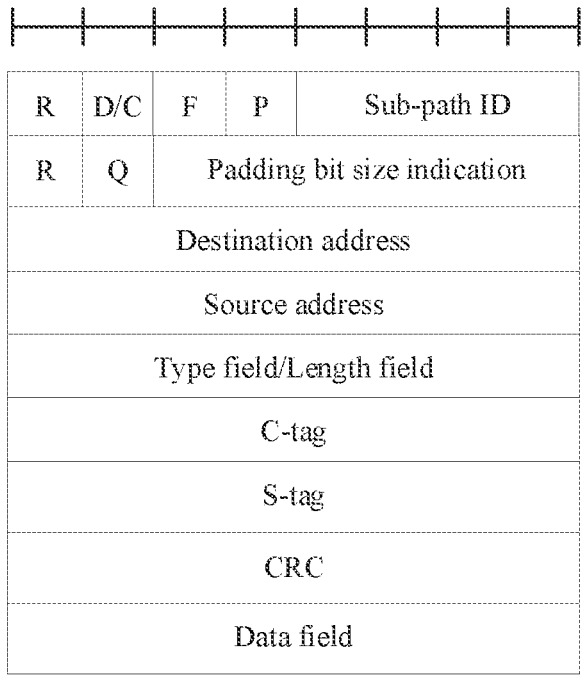
FIG. 11 is a schematic structural diagram of a data packet in accordance with implementations of the present disclosure.

Referring to FIG. 11, the data packet may include:

R, R, D/C, F, P, Q, a sub-path ID, a padding bit size indication, a destination address, a source address, a type field/length field, a C-tag, S-tag, CRC and a data field.

Figure 12:
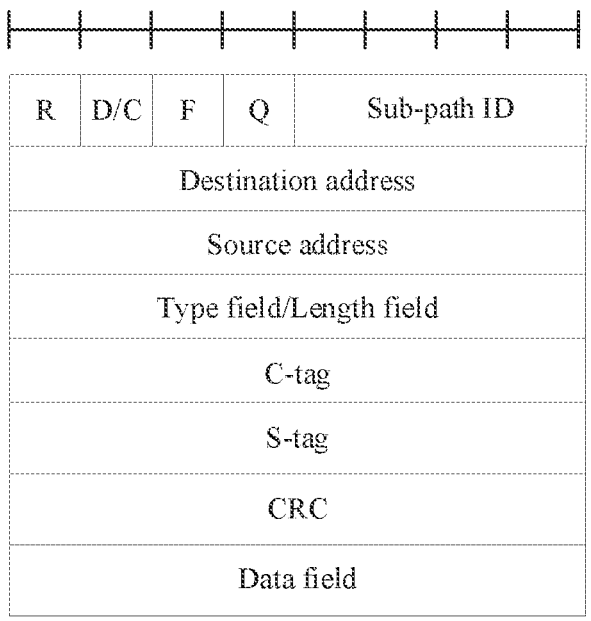
FIG. 12 is a schematic structural diagram of a data packet in accordance with implementations of the present disclosure.

Referring to FIG. 12, the data packet may include:

R, D/C, F, Q, a sub-path ID, a destination address, a source address, a type field/length field, a C-tag, an S-tag, a CRC and a data field.

Figure 13:
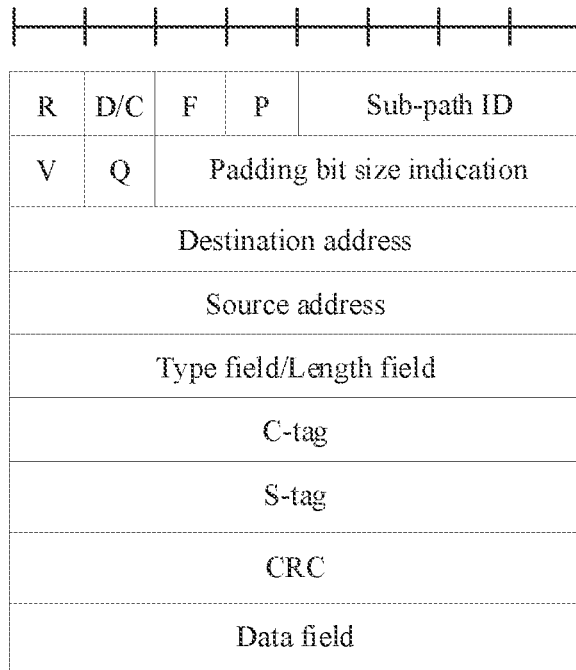
FIG. 13 is a schematic structural diagram of a data packet in accordance with implementations of the present disclosure.

Referring to FIG. 13, the data packet may include:

R, D/C, F, P, V, Q, a sub-path ID, a padding bit size indication, a destination address, a source address, a type field/length field, a C-tag, an S-tag, CRC and a data field.

Figure 14:
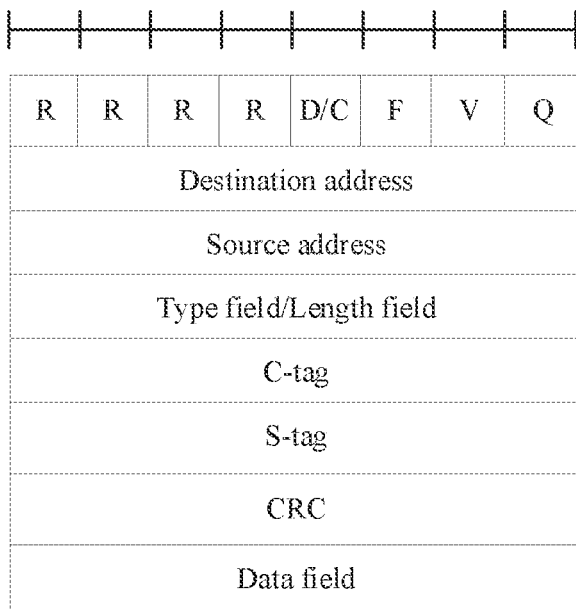
FIG. 14 is a schematic structural diagram of a data packet in accordance with implementations of the present disclosure.

Referring to FIG. 14, the data packet may include:

R, R, R, R, D/C, F, V, Q, a destination address, a source address, a type field/length field, a C-tag, an S-tag, CRC and a data field.

Figure 15:
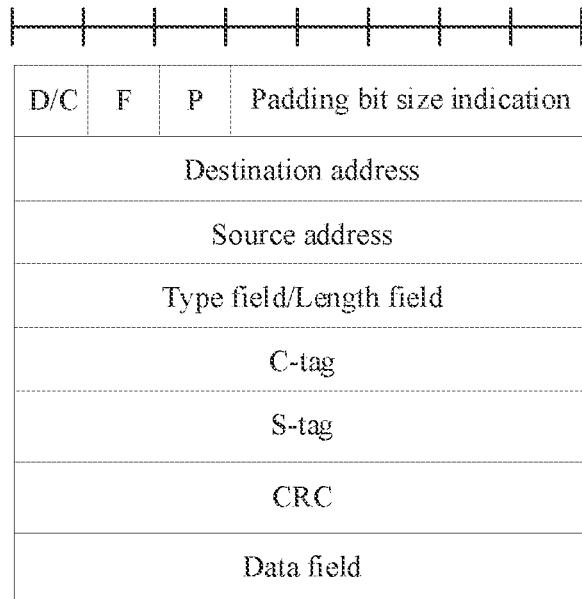
FIG. 15 is a schematic structural diagram of a data packet in accordance with implementations of the present disclosure.

Referring to FIG. 15, the data packet may include:

D/C, F, P, a padding bit size indication, a destination address, a source address, a type field/length field, a C-tag, an S-tag, CRC and a data field.

Figure 16:
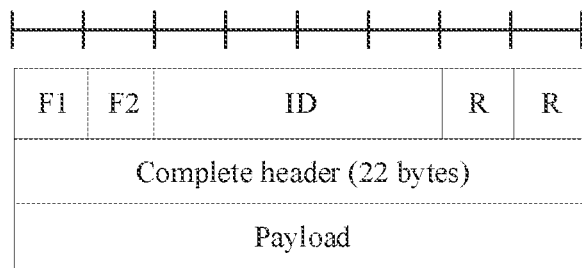
FIG. 16 is a schematic structural diagram of a data packet in accordance with implementations of the present disclosure.

Referring to FIG. 16, the data packet may include:

F1, F2, ID, R, R, a complete header and payload.

Figure 17:
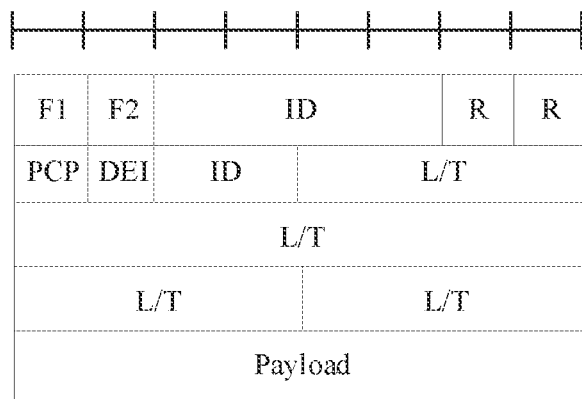
FIG. 17 is a schematic structural diagram of a data packet in accordance with implementations of the present disclosure.

Referring to FIG. 17, the data packet may include:

F1, F2, ID, R, R, a PCP, a DEI, an ID, L/T, L/T, L/T and payload.

Figure 18:
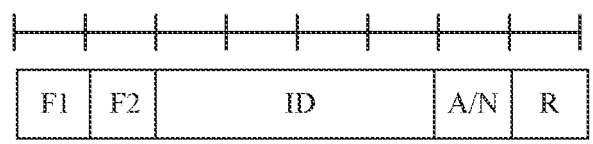
FIG. 18 is a schematic structural diagram of a data packet in accordance with implementations of the present disclosure.

Referring to FIG. 18, the data packet may include:

F1, F2, ID, A/N and R.

It should be noted that the above are only described by way of example and should not be understood as limitations to the present disclosure.

For example, one or more common identifiers may be used to indicate various combinations of the above information. If the common identifiers are use, the identification fields indicated separately are no longer required be included. For example, if a W identifier of 1 bit is used to indicate whether the Q-tag and the length field are compressed, then at least one of the indication identifiers V, Q and L is no longer required. As another example, if an M identifier of 1 bit is used to indicate whether the Q-tag and the type field are compressed, then at least one of the indication identifiers V, Q and L is no longer required.

As another example, at least portion of the variable field parts are indicated individually. For example, if the PCP and DEI are variable fields, the PCP is indicated using 1 bit or 2 bits, and the DEI is indicated using 1 bit or 4 bits. A first variable field indication or a second variable field indication is another example.

As another example, the variable field parts are indicated uniformly. For example, if the PCP and DEI are variable fields, PCP+DEI is indicated using 1 bit or 5 bits. As another example, the first variable field indication and the second variable field indication can be combined into one piece of indication information.

As another example, a Q bit of 1 bit can be used to indicate whether the PCP+DEI is changed or a Q bit of 5 bits can indicate whether the PCP+DEI is changed (Q bit of 1 bit+PCP field of 3 bits+DEI field of 1 bit).

As another example, the data packet may also include header compression indication information, which may indicate whether one or more fields have been compressed, are contained or are changed through at least one bit. For example, the header compression indication information can indicate whether the following information has been compressed, is contained or is changed through at least one bit:

a destination address field;
a source address field;
a type field;
a length field;
a virtual local area network (VLAN) field or a Q-tag;
a C-tag;
an S-tag;
a tag protocol ID (TPID);
a virtual local area network ID (VID);
a priority code point (PCP);
a drop eligible indicator (DEI);
a data field;
padding bits; and
cyclic redundancy check (CRC).

It should be noted that the first data packet or the second data packet may include all the above-mentioned fields and indications, or may only include some of the above-mentioned fields and/or indications, which is not specifically limited in the implementations of the present disclosure. In other words, for the packet format of the Ethernet frame data packet, it does not necessarily include all indications or fields. In addition, the ordering of the indications or fields in the data packet may be the same as or different from the ordering of the indications or fields shown in the drawings, which is not specifically limited in the implementations of the present disclosure. For example, for the same information, the order in which they are placed may be the same as or different from the order shown in the drawings).

With reference to FIG. 7, the data packet may also include R, R, R, D/C, F, P, first information, a padding hit size indication, a destination address, a source address, a type field/length field, a C-tag, an S-tag, CRC and a portion of fields or indications in a data field. Or the position of R can be set in the middle or back of the packet.

The decompression device determines whether to decompress the target data packet after receiving the sent target data packet from the compression device. The decompression device performs the decompression according to information carded in the data packet when determining that the target data packet is decompressed.

The preferred implementations of the present disclosure have been described in detail above in combination with the drawings, but the present disclosure is not limited to the specific details of the above implementations. Various simple variations can be made to the technical scheme of the present disclosure within the scope of technical conception of the present disclosure, and belong to the protection scope of the present disclosure.

It should be noted that the number of bytes of the length field in the implementations of the present disclosure can represent a value of the length field, or byte data of the length part, or (actually) the size of the data part of the Ethernet packet.

For example, various specific technical features described in the above specific implementations can be combined in any suitable way without conflict. In order to avoid unnecessary repetition, various possible combinations will not be described separately in the present disclosure.

As another example, different implementations of the present disclosure can be combined arbitrarily, and as long as they do not violate the idea of the present disclosure, they should also be regarded as the contents disclosed in the present disclosure.

It should be understood that sizes of serial numbers of the foregoing processes do not mean execution sequences in various method implementations of the present disclosure. The execution sequences of the processes should be determined according to functions and internal logics of the processes, and should not be construed as any limitation to implementation processes of the implementations of the present disclosure.

The method implementations of the present disclosure are described in detail above in combination with FIGS. 1 to 18. Device implementations of the present disclosure will be described in detail below in combination with FIGS. 19 to 22.

Figure 19:
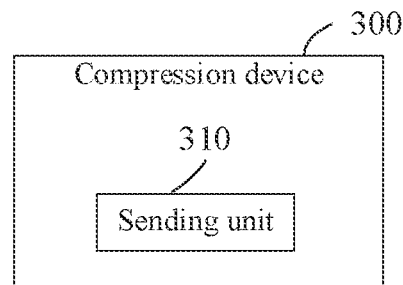
FIG. 19 is a schematic block diagram of a compression device in accordance with an implementation of the present disclosure.

FIG. 19 is a schematic block diagram of a compression device 300 in accordance with an implementation of the present disclosure.

Referring to FIG. 19, the compression device 300 may include:

a communication unit 310 configured to send a first data packet or a second data packet according to a compression parameter of an Ethernet frame, the second data packet being a compressed data packet of the first data packet.

Optionally, the communication unit 310 is further configured to:

receive the compression parameter sent by an access network device or a core network device.

Optionally, the compression device further includes:

a first determining unit configured to determine whether to compress the first data packet according to the compression parameter.

Optionally, the compression parameter includes a first index.

The communication unit 310 is specifically configured to:

send the first data packet when the first index is used to indicate that an Ethernet frame data packet is not compressed, and/or not compress the first data packet when the first index is used to indicate that the Ethernet frame data packet is not compressed.

Optionally, the communication unit 310 is specifically configured to:

determine a first compression object according to the first index; and send the second data packet with the first compression object compressed.

Optionally, the communication unit 310 is more specifically configured to:

determine the first compression object corresponding to the first index according to the first index and a first corresponding relationship, the first corresponding relationship including at least one compression object and an index corresponding to the at least one compression object, and the at least one compression object including the first compression object.

Optionally, the at least one compression object includes at least one of:

a destination address field, a source address field, a type field, a length field, a virtual local area network (ULAN) field, a Q-tag, a C-tag, an S-tag, a tag protocol ID (TPID), a virtual local area network ID (VID), a priority code point (PCP), a drop eligible indicator (DEI) and padding hits in a data field.

Optionally, the at least one compression object includes at least one of:
a Q-tag and a frame header of the Ethernet frame;
a C-tag and a frame header of the Ethernet frame;
an S-tags and a frame header of the Ethernet frame;
a C-tag, an S-tag and a frame header of the Ethernet frame;
a Q-tag, a frame header of the Ethernet frame and padding bits;
a C-tag, a frame header of the Ethernet frame and padding bits;
an S-tag, a frame header of the Ethernet frame and padding bits;
a C-tag, an S-tag, a frame header of the Ethernet frame and padding bits;
padding bits;
a Q-tag and padding bits;
a C-tag and padding bits;
an S-tag and padding bits;
a C-tag, an S-tag and padding bits;
a frame header of the Ethernet frame;
a Q-tag;
a C-tag;
an S-tag;
a C-tag and an S-tag;
a destination address field;
a source address field;
a type field; and
a length field.

Optionally, the frame header of the Ethernet frame includes at least one of:
a destination address field;
a source address field;
a type field; and
a length field.

Optionally, one index in the first corresponding relationship corresponds to one or more compression objects.

Optionally, the first index includes a plurality of indexes.

Optionally, the first corresponding relationship is preconfigured information.

Optionally, the communication unit 310 is further configured to:
send the first index to a decompression device.

Optionally, the first data packet or the second data packet includes the first index.

Optionally, the compression parameter includes first indication information, which is used to indicate a compression object or a non-compression object in the Ethernet frame data packet.

Optionally, the first indication information is specifically used to indicate that the non-compression object in the Ethernet frame data packet includes at least one of:
a destination address field, a source address field, a type field, a length field, a virtual local area network (VLAN) field, a Q-tag, a C-tag, an S-tag, a tag protocol ID (TPID), a virtual local area network ID (VID), a priority code point (PCP), a drop eligible indicator (DEI) and padding bits in a data field.

Optionally, the first indication information is specifically used to indicate that the compression object in the Ethernet frame data packet includes at least one of:
a destination address field, a source address field, a type field, a length field, a virtual local area network (VLAN) field, a Q-tag, a C-tag, an S-tag, a tag protocol ID (TPID), a virtual local area network ID (VID), a priority code point (PCP), a drop eligible indicator (DEI) and padding bits in a data field.

Optionally, the first indication information is used to indicate whether the compression object in the Ethernet frame data packet includes the padding bits in the data field, or whether the Ethernet frame data packet includes the padding bits, or whether the Ethernet frame data packet has the compressed padding bits.

Optionally, the communication unit 310 is further configured to:
send the first indication information to the decompression device.

Optionally, the first data packet or the second data packet includes the first indication information.

Optionally, the compression device further includes:
a second determining unit configured to determine whether to compress or drop the padding bits in the data field of the first data packet.

Optionally, the second determining unit is specifically configured to:
compress or drop the padding bits in the data field of the first data packet when a first condition is met.

Optionally, the first condition includes at least one of:
that the frame format of the Ethernet frame is an 802.3 format;
that the type/length field of the Ethernet frame represents a length field;
that a value of the type/length field of the Ethernet frame is less than a first threshold;
compression of the padding bits is configured by access network or core network or predefined;
that the decompression device has an ability to decompress or recover the padding bits;
that the compression device has sent X uncompressed data packets;
that the compression device has received Y header-compressed feedback packets representing acknowledgement (ACK);
that the compression device has an ability to compress the padding bits;
that indication information of compression or dropping of the padding bits by the decompression device is received;
that the length field is compressed or needs to be compressed; and
that the length field is not compressed.

Optionally, the decompression device having the ability to decompress or recover the padding bits means that the decompression device satisfies at least one of:
that the decompressing device indicates that the decompressing device has the ability to decompress or recover the padding bits;
that the decompression device has the ability to recover the padding bits based on decoding of information of a data part;
that the decompression device has an ability to deeply decode the information of the data part; and
that the decompression device can recover the padding bits according to a lower layer data packet.

Optionally, the communication unit 310 is further configured to:
send second indication information, which is used to indicate the size of the padding bits in the data packet or the size of the padding bits, before compressed, in the data packet.

Optionally, the first data packet or the second data packet includes the second indication information.

Optionally, the communication unit 310 is further configured to:

send third indication information, which is used to indicate whether the Ethernet frame data packet includes the padding bits or whether the Ethernet frame data packet includes the compressed padding hits.

Optionally, the first data packet or the second data packet includes the third indication information.

Optionally, the first data packet or the second data packet includes at least one of:

a destination address field;
a source address field;
a type field;
a length field;
a virtual local area network (VLAN) field or a Q-tag;
a C-tag;
an S-tag;
a tag protocol ID (TPID);
a virtual local area network ID (VID);
a priority code point (PCP);
a drop eligible indicator (DEI);
a data field;
padding bits;
cyclic redundancy check (CRC);
a packet indication for indicating that the current data packet is a feedback packet or a data packet;
a first variable field indication used to indicate whether a variable field part of the Ethernet frame data packet has been compressed, or whether the variable field part of the Ethernet frame data packet is changed, or whether the variable field part of the Ethernet frame data packet is contained;
a second variable field indication used to indicate whether a variable field part of a frame header of the Ethernet frame data packet has been compressed, or whether the variable field part is contained in the Ethernet frame data packet, or whether the variable field part of the frame header of the Ethernet frame data packet is changed;
a Q-tag variable field indication used to indicate whether a variable field part in the Q-tag has been compressed, or whether the data packet contains the variable field part, or whether the variable field part is changed, or whether the variable field part is compressed;
a C-tag variable field indication used to indicate whether a variable field part in the C-tag has been compressed, or whether the data packet contains the variable field part, or whether the variable field part is changed, or whether the variable field part is compressed;
an S-tag variable field indication used to indicate whether a variable field part in the S-tag has been compressed, or whether the data packet contains the variable field part, or whether the variable field part is changed, or whether the variable field part is compressed;
a padding bit size indication for indicating the size of the padding bits of the current data packet;
a padding bit compression indication used to indicate whether the padding bits are compressed, or whether the padding bits of the current data packet have been compressed, or whether the current data packet contains the padding bits, or whether the length of the padding bits is changed;
a sub-path ID used to identify a context index or identifier that can be mapped to different data packets of the header compression configuration or object;
a packet compression indication used to indicate whether the current data packet is a compressed data packet or an uncompressed data packet;

a header compression indication used to indicate compressed sub-header information of the current data packet;

a virtual local area network (VLAN) compression indication used to indicate whether the Q-tag has been compressed or the S-tag and/or the C-tag or at least portion thereof has been compressed, or whether the Q-tag is contained or the S-tag and/or the C-tag or at least portion thereof has been compressed, or whether the Q-tag has been compressed or the S-tag and/or the C-tag or at least portion thereof is changed;

a length field indication used to indicate whether the length field has been compressed, or whether the length field is contained, or whether the length field is changed; and a type field indication used to indicate whether the type field has been compressed, or whether the type field is contained, or whether the type filed is changed.

Optionally, the compression device further includes:

a third determining unit configured to determine whether to compress the length field in the first data packet.

Optionally, the third determining unit is specifically configured to:

compress the length field when the padding bits in the data field of the first data packet are compressed or removed; and/or not compress the length field when the padding bits in the data field of the first data packet are not compressed or removed.

Optionally, the first data packet or the second data packet includes the length field.

Optionally, the communication unit 310 is specifically configured to:

send the second data packet after receiving X uncompressed data packets; and/or send the second data packet after receiving Y feedback packets of the uncompressed data packets representing acknowledgement (ACK).

Optionally, the communication unit 310 is further configured to:

report a compression capability, which is used to indicate whether the compression device supports compression of the Ethernet frame, and/or indicate supported compression objects.

Optionally, compression parameters corresponding to the same bearer are the same or different, and/or compression parameters corresponding to uplink and compression parameters corresponding to downlink are the same or different.

It should be understood that the device implementations may correspond to the method implementations, and similar description thereof may be made with reference to the method implementations. Specifically, the compression device 300 shown in FIG. 19 may correspond to the corresponding entities Which execute the methods in accordance with the implementations of the present disclosure, and the foregoing and other operations and/or functions of various units in the compression device 300 are used respectively for implementing the corresponding processes in various methods, and will not be repeated herein for the sake of brevity.

Figure 20:
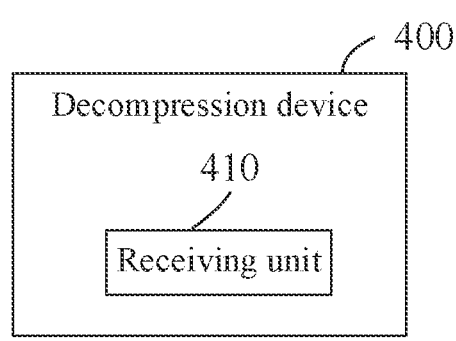
FIG. 20 is a schematic block diagram of a decompression device in accordance with an implementation of the present disclosure.

FIG. 20 is a schematic block diagram of a decompression device 400 in accordance with an implementation of the present disclosure.

Specifically, as shown in FIG. 20, the decompression device 400 may include:

a communication unit 410 configured to receive a target data packet;

a determining unit 420 configured to determine whether to decompress the target data packet.

Optionally, the determining unit 420 is further configured to:

determine a compression object or a decompression object in the target data packet.

Optionally, the compression object or decompression object includes at least one of:

a destination address field, a source address field, a type field, a length field, a virtual local area network VLAN field, Q-tags, C-tags, S-tags, a tag protocol ID (TPID), a virtual local area network ID (VID), a priority code point (PCP), a drop eligible indicator (DEI) and padding bits in a data field.

Optionally, the determining unit 420 is specifically configured to:

determine whether to decompress or recover the padding bits in the target data packet.

Optionally, the determining unit 420 is more specifically configured to:

decompress or recover the padding bits in the target data packet when a second condition is met.

Optionally, the second condition includes at least one of:

that the frame format of the Ethernet frame is an 802.3 format;

that the type/length field of the Ethernet frame represents information of the length field;

that the value of the type/length field of the Ethernet frame is less than a first threshold;

compression of the padding hits is configured by access network or core network or predefined;

that the decompression device has an ability to decompress or recover the padding bits;

that header compression is not performed on the length field in the data packet;

that the Ethernet frame data packet is less than 64 bytes;

that a data part of the Ethernet frame data packet is less than 46 bytes;

that the decompressed Ethernet frame data packet is less than 64 bytes;

that a data part of the decompressed. Ethernet frame data packet is less than 46 bytes;

that an indication whether the padding bits have been compressed is received;

that an indication of the length occupied by the padding hits is received;

that a padding bit compression indication is received;

that the compression device has sent the X uncompressed data packets;

that the compression device has received the Y header compressed feedback packets representing acknowledgement (ACK);

that the compression device has an ability to compress the padding bits;

that the padding bits are compressed or removed;

that the length field is compressed;

that an indication of an ability of the compression device to compress the padding bits is received; and that the length field is not compressed or the length field is included in the data packet.

Optionally, the decompression device having the ability to decompress or recover the padding bits means that the decompression device satisfies at least one of:

that the decompressing device indicates that the decompressing device has the ability to decompress or recover the padding bits;

that the decompression device has the ability to recover the padding bits based on decoding of information of the data part;

that the decompression device has an ability to deeply decode the information of the data part; and that the decompression device can recover the padding bits according to a lower layer data packet.

Optionally, the decompression device further includes:

an adding unit configured to add a 0- or 1-bit string with the same number of bytes as the padding bits behind valid data of the data field or Ethernet frame in the target data packet to obtain the decompressed or final data field.

Optionally, the determining unit 420 is further configured to:

determine the number of bytes of the padding bits according to information of the length field in the target data packet.

Optionally, the determining unit 420 is specifically configured to:

subtract the number of bytes of the length field from 46 bytes to obtain the number of bytes of the padding bits.

Optionally, the determining unit 420 is further configured to:

determine the number of bytes of the padding bits in the target data packet and/or the information of the length field in the target data packet according to length field indication carried in the lower layer data packet.

Optionally, the length field indication carries at least one of:

a radio link control (RLC) packet, a media access control (MAC) packet and a packet data convergence protocol (PDCP) packet.

Optionally, the communication unit 410 is further configured to:

receive second indication information, which is used for indicating the size of padding bits of the target data packet or the size of padding bits before compression.

Optionally, the determining unit 420 is further configured to:

decompress or recover the padding bits in the target data packet according to the second indication information.

Optionally, the target data packet includes the second indication information.

Optionally, the communication unit 410 is further configured to:

send third indication information, which is used to indicate whether the Ethernet frame data packet includes the padding bits or whether the Ethernet frame data packet includes the compressed padding bits.

Optionally, the communication unit 410 is further configured to:

decompress or recover the padding bits in the target data packet according to the third indication information.

Optionally, the target data packet includes the third indication information.

Optionally, the determining unit 420 is further configured to:

determine whether the padding bits in the target data packet are compressed or removed; or determine whether the target data packet includes the padding bits.

Optionally, the determining unit 420 is specifically configured to:

determine whether the length field in the target data packet is decompressed by the decompression device.

Optionally, the determining unit 420 is further configured to:

determine whether the length field in the target data packet is decompressed according to whether the padding bits in the target data packet have been compressed.

Optionally, the determining unit 420 is specifically configured to:

decompress or recover the length field in the target data packet when the padding bits in the target data packet have been compressed or removed; and/or not decompress or recover the length field in the target data packet when the padding bits in the target data packet are not compressed or removed.

Optionally, the determining unit 420 is further configured to:

determine whether the length field in the target data packet has been compressed; or determine whether the target data packet includes the length field.

Optionally, the determining unit 420 is further configured to:

determine that the length field in the target data packet does not need to be decompressed or recovered; or determine that the length field in the target data packet is not compressed or that the target data packet includes the length field.

Optionally, the determining unit 420 is further configured to:

determine the number of bytes of the length field according to the size of the padding bits in the target data packet; or determine the number of bytes of the length field according to the size of the padding bits, before compressed, in the target data packet.

Optionally, the size of the padding bits is the number of bytes of the padding bit.

Optionally, the determining unit 420 is specifically configured to:

subtract the number of bytes of the padding bits from 46 bytes to obtain the number of bytes of the length field.

Optionally, the determining unit 420 is specifically configured to:

determine whether to decompress the type field in the target data packet.

Optionally, the determining unit 420 is further configured to:

determine a compression parameter.

Optionally, the communication unit 410 is further configured to:

receive the compression parameter sent by an access network device or a core network device.

Optionally, the compression parameter includes a first index.

Optionally, the determining unit 420 is specifically configured to:

determine that the target data packet does not need to be decompressed or recovered when the first index is used to indicate that the Ethernet frame data packet is not compressed.

Optionally, the determining unit 420 is further configured to:

determine a first compression object according to the first index; and decompress or recover the first compression object in the target data packet.

Optionally, the determining unit 420 is specifically configured to:

determine the first compression object corresponding to the first index according to the first index and a first corresponding relationship, the first corresponding relationship including at least one compression object and an index corresponding to the at least one compression object, and the at least one compression object including the first compression object.

Optionally, the at least one compression object includes at least one of:

a destination address field, a source address field, a type field, a length field, a virtual local area network (VLAN) field, a Q-tag, a C-tag, an S-tag, a tag protocol ID (TPID), a virtual local area network ID (VID), a priority code point (PCP), a drop eligible indicator (DEI) and padding hits in a data field.

Optionally, the at least one compression object includes at least one of:

a Q-tag and a frame header of the Ethernet frame;
a C-tag and a frame header of the Ethernet frame;
an S-tags and a frame header of the Ethernet frame;
a C-tag, an Stag and a frame header of the Ethernet frame;
a Q-tag, a frame header of the Ethernet frame and padding bits;
a C-tag, a frame header of the Ethernet frame and padding bits;
an S-tag, a frame header of the Ethernet frame and padding hits;
a C-tag, an S-tag, a frame header of the Ethernet frame and padding bits;
padding bits;
a Q-tag and padding bits;
a C-tag and padding bits;
an S-tag and padding bits;
a C-tag, an S-tag and padding bits;
a frame header of the Ethernet frame;
a Q-tag;
a C-tag;
an S-tag;
a C-tag and an S-tag;
a destination address field;
a source address field;
a type field; and
a length field.

Optionally, the frame header of the Ethernet frame includes at least one of:

a destination address field;
a source address field;
a type field; and
a length field.

Optionally, one index in the first corresponding relationship corresponds to one or more compression objects.

Optionally, the first index includes a plurality of indexes.

Optionally, the first corresponding relationship is preconfigured information.

Optionally, the communication unit 410 is further configured to:

receive the first index sent by the compression device.

Optionally, the target data packet includes the first index.

Optionally, the compression parameter includes first indication information, which is used to indicate a compression object or a non-compression object in the Ethernet frame data packet.

Optionally, the first indication information is specifically used to indicate that the non-compression object in the Ethernet frame data packet includes at least one of:

a destination address field, a source address field, a type field, a length field, a virtual local area network (VLAN) field, a Q-tag, a C-tag, an S-tag, a tag protocol ID (TPID), a virtual local area network ID (VID), a priority code point (PCP), a drop eligible indicator (DEI) and padding bits in a data field.

Optionally, the first indication information is specifically used to indicate that the compression object in the Ethernet frame data packet includes at least one of:

a destination address field, a source address field, a type field, a length field, a virtual local area network (VLAN) field, a Q-tag, a C-tag, an S-tag, a tag protocol ID (TPID), a virtual local area network ID (VID), a priority code point (PCP), a drop eligible indicator (DEI) and padding bits in a data field.

Optionally, the first indication information is used to indicate whether the compression object in the Ethernet frame data packet includes the padding bits in the data field, or whether the Ethernet frame data packet includes the padding bits, or whether the Ethernet frame data packet has the compressed padding bits.

Optionally, the communication unit 410 is further configured to:

receive the first indication information sent by the compression device.

Optionally, the target data packet includes the first indication information.

Optionally, the target data packet includes at least one of:
a destination address field;
a source address field;
a type field;
a length field;
a virtual local area network (VLAN) field or a Q-tag;
a C-tag;
an S-tag;
a tag protocol ID (TPID);
a virtual local area network ID (VID);
a priority code point (PCP);
a drop eligible indicator (DEI);
a data field;
padding bits;
cyclic redundancy check (CRC);
a packet indication for indicating that the current data packet is a feedback packet or a data packet;
a first variable field indication used to indicate whether a variable field part of the Ethernet frame data packet has been compressed, or whether the variable field part of the Ethernet frame data packet is changed, or whether the variable field part of the Ethernet frame data packet is contained;
a second variable field indication used to indicate whether a variable field part of a frame header of the Ethernet frame data packet has been compressed, or whether the variable field part is contained in the Ethernet frame data packet, or whether the variable field part of the frame header of the Ethernet frame data packet is changed;
a Q-tag variable field indication used to indicate whether a variable field part in the Q-tag has been compressed, or whether the data packet contains the variable field part, or whether the variable field part is changed, or whether the variable field part is compressed;
a C-tag variable field indication used to indicate whether a variable field part in the C-tag has been compressed, or whether the data packet contains the variable field part, or whether the variable field part is changed, or whether the variable field part is compressed;
an S-tag variable field indication used to indicate whether a variable field part in the S-tag has been compressed, or whether the data packet contains the variable field part, or whether the variable field part is changed, or whether the variable field part is compressed;
a padding bit size indication for indicating the size of the padding bits of the current data packet;

a padding bit compression indication used to indicate whether the padding bits are compressed, or whether the padding bits of the current data packet have been compressed, or whether the current data packet contains the padding bits, or whether the length of the padding bits is changed;

a sub-path ID used to identify a context index or identifier that can be mapped to different data packets of the header compression configuration or object;

a packet compression indication used to indicate whether the current data packet is a compressed data packet or an uncompressed data packet;

a header compression indication used to indicate compressed sub-header information of the current data packet;

a virtual local area network (VLAN) compression indication used to indicate whether the Q-tag has been compressed or the S-tag and/or the C-tag or at least portion thereof has been compressed, or whether the Q-tag is contained or the S-tag and/or the C-tag or at least portion thereof has been compressed, or whether the Q-tag has been compressed or the S-tag and/or the C-tag or at least portion thereof is changed;

a length field indication used to indicate whether the length field has been compressed, or whether the length field is contained, or whether the length field is changed; and a type field indication used to indicate whether the type field has been compressed, or whether the type field is contained, or whether the type filed is changed.

Optionally, the determining unit 420 is specifically configured to:

decompress the target data packet after receiving X uncompressed data packets.

Optionally, the determining unit 420 is specifically configured to:

decompress the target data packet after sending Y feedback packets of the uncompressed data packets representing acknowledgement (ACK).

Optionally, the communication unit 410 is further configured to:

receive a compression capability reported by a compression device, wherein the compression capability is used to indicate whether the compression device supports compression of the Ethernet frame, and/or indicate supported compression objects.

Optionally, compression parameters corresponding to the same bearer are the same or different.

Optionally, compression parameters corresponding to uplink and compression parameters corresponding to downlink are the same or different.

It should be understood that the device implementations may correspond to the method implementations, and similar description thereof may be made with reference to the method implementations. Specifically, the decompression device 400 shown in FIG. 20 may correspond to the corresponding entities Which execute the methods in accordance with the implementations of the present disclosure, and the foregoing and other operations and/or functions of various units in the decompression device 400 are used respectively for implementing the corresponding processes in various methods, and will not be repeated herein for the sake of brevity.

The communication device in accordance with the implementations of the present disclosure is described above from the perspective of functional modules.

It should be understood that the functional modules can be implemented in the form of hardware, or by instructions in the form of software, or by a combination of hardware and software modules.

Specifically, each step of the method implementations in accordance with the implementations of the present disclosure can be completed by integrated logic circuits in the form of hardware and/or by instructions in the form of software in a processor, and steps of the methods disclosed in combination with the implementations of the present disclosure can be directly embodied as being executed by a hardware decoding processor, or by a combination of hardware and software modules in the decoding processor.

The software modules may be located in a storage medium, such as a random access memory, a flash memory, a read-only memory, a programmable read-only memory or an electrically erasable programmable memory, or a register, which is mature in the art. The storage medium is located in the memory, and the processor reads information in the memory and completes the steps of the above methods in conjunction with its hardware.

For example, in the implementations of the present disclosure, the sending unit 310 shown in FIG. 19 and the receiving unit 410 shown in FIG. 20 can be implemented by a transceiver.

Figure 21:
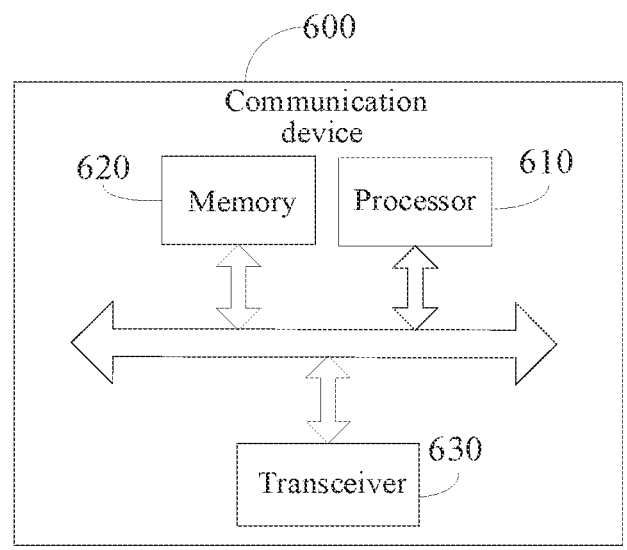
FIG. 21 is a schematic block diagram of a communication device in accordance with an implementation of the present disclosure.

FIG. 21 is a schematic structural diagram of a communications device 600 in accordance with an implementation of the present disclosure.

Referring to FIG. 21, the communication device 600 may include a processor 610, which may call and run a computer program from a memory to implement the methods in accordance with the implementations of the present disclosure.

Optionally, the communication device 600 may further include the memory 620.

The memory 620 may be used for storing indication information, or may further be used for storing codes, instructions, etc. The processor 610 may call and run the computer program from the memory 620 to implement the methods in accordance with the implementations of the present disclosure.

The memory 620 may be a separate device independent of the processor 610 or may be integrated in the processor 610.

Optionally, the communication device 600 may further include a transceiver 630.

The processor 610 can control the transceiver 630 to communicate with other devices, specifically, the transceiver 630 may send information or data to other devices or receive information or data sent by other devices.

The transceiver 630 may include a transmitter and a receiver. The transceiver 630 may further include antennas, the number of which may be one or more.

Optionally, the communication device 600 may be the compression device in accordance with the implementations of the present disclosure, and the communication device 600 may implement the corresponding processes implemented by the network device in various methods in accordance with the implementations of the present disclosure. That is to say, the communication device 600 in accordance with the implementation of the present disclosure may correspond to the compression device 300 in accordance with the implementation of the present disclosure, and may correspond to the corresponding entities which execute the methods in accordance with the implementations of the present invention, and will not be repeated herein for brevity.

Optionally, the communication device 600 may be the decompression device in accordance with the implementations of the present disclosure, and the communication device 600 may implement the corresponding processes implemented by the terminal device in various methods in accordance with the implementations of the present disclosure. That is to say, the communication device 600 in accordance with the implementation of the present disclosure may correspond to the decompression device 400 in accordance with the implementation of the present disclosure, and may correspond to the corresponding entities which execute the methods in accordance with the implementations of the present invention, and will not be repeated herein for brevity.

Various components in the communication device 600 are connected via a bus system. In addition to data buses, the bus system further includes power buses, control buses, status signal buses, etc.

In addition, the implementation of the present disclosure further provides a chip, which may be an integrated circuit chip with signal processing capability, and can implement or execute various methods, steps and logic block diagrams disclosed in the implementations of the present disclosure.

Optionally, the chip can be applied to various communication devices, so that the communication devices having the chip installed therein can execute various methods, steps and logic block diagrams disclosed in the implementations of the present disclosure.

Figure 22:
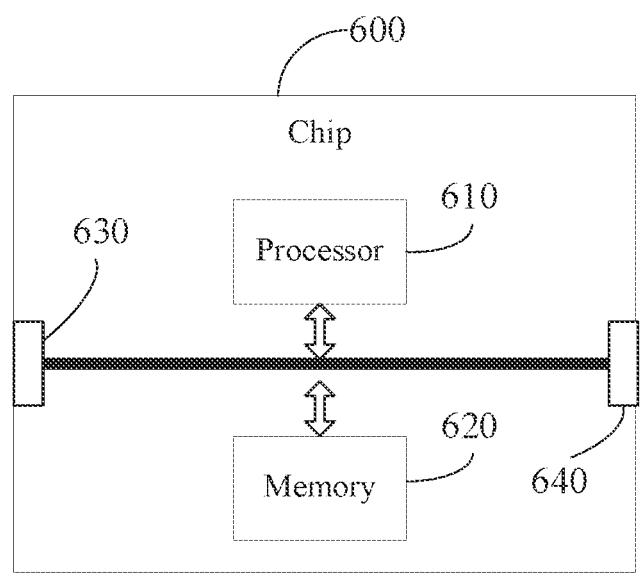
FIG. 22 is a schematic block diagram of a chip in accordance with an implementation of the present disclosure.

FIG. 22 is a schematic structural diagram of a chip in accordance with an implementation of the present disclosure.

Referring to FIG. 22, the chip 700 may include a processor 710.

The processor 710 may call and run a computer program from a memory 720 to implement the methods in accordance with the implementations of the present disclosure.

Optionally, as shown in FIG. 5, the chip 700 may further include a memory 720. The processor 710 may call and run the computer program from the memory 720 to implement the methods in accordance with the implementations of the present disclosure. The memory 720 may be used for storing indication information, or may further be used for storing codes, instructions, etc., which are executed by the processor 710.

The memory 720 may be a separate device independent of the processor 710 or may be integrated in the processor 710.

Optionally, the chip 700 may further include an input interface 730. The processor 710 may control the input interface 730 to communicate with other devices or chips. Specifically, the processor 710 may acquire information or data sent by other devices or chips.

Optionally, the chip 700 may further include an output interface 740. The processor 710 may control the output interface 740 to communicate with other devices or chips. Specifically, the processor 710 may output information or data to other devices or chips.

Optionally, the chip may be applied to the network device in the implementations of the present disclosure, and the chip may implement the corresponding processes implemented by the network device in various methods in accordance with the implementations of the present disclosure, which will not be repeated herein for brevity.

Optionally, the chip may be applied to the terminal device in the implementations of the present disclosure, and the chip may implement the corresponding processes implemented by the network device in various methods in accordance with the implementations of the present disclosure, which will not be repeated herein for brevity.

It should be understood that the chip mentioned in the implementations of the present disclosure may be referred to as a system-level chip, a system chip, a chip system or a system-on-chip, etc. It should also be understood that various components in the chip 700 are connected via a bus system. In addition to data buses, the bus system further includes power buses, control buses, status signal buses, etc.

The processor may include, but is not limited to:

a general purpose processor, a digital signal processor (DSP), an application specific integrated circuit (ASIC), a field programmable gate array (FPGA) or another programmable logic device, a discrete gate or a transistor logic device, or a discrete hardware component.

The processor may implement or perform the methods, steps and logical block diagrams disclosed in the implementations of the present disclosure. The steps of the methods disclosed in combination with the implementations of the present disclosure can be directly embodied as being executed by a hardware decoding processor, or by a combination of hardware and software modules in the decoding processor. The software modules may be located in a storage medium, such as a random access memory, a flash memory, a read-only memory, a programmable read-only memory or an electrically erasable programmable memory, or a register, which is mature in the art. The storage medium is located in the memory, and the processor reads information in the memory and completes the steps of the above methods in conjunction with its hardware.

The memory includes, but is not limited to, a volatile memory and/or a nonvolatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM), and is used as an external cache. By way of example, but not limitation, many forms of RAMS are available, such as a static RAM (SRAM), a dynamic RAM (DRAM), a synchronous DRAM (SDRAM), a double data rate SDRAM (DDR SDRAM), an enhanced SDRAM (ESDRAM), a Synch link DRAM (SLDRAM), and a Direct Rambus RAM (DR RAM).

It should be noted that the memory in the systems and methods described herein is intended to include, but be not limited to, these and any other suitable types of memory.

An implementation of the present disclosure further provides a computer readable storage medium used to store a computer program. The computer readable storage medium stores one or more programs including instructions, which, when executed by a portable electronic device including multiple application programs, cause the portable electronic device to perform the methods 300 to 500 in accordance with the implementations.

Optionally, the computer readable storage medium may be applied to the network device in the implementations of the present disclosure, and the computer program causes a computer to perform the corresponding processes implemented by the network device in various methods in accordance with the implementations of the present disclosure, which will not be repeated herein for brevity.

Optionally, the computer readable storage medium may be applied to the motile terminal/terminal device in the implementations of the present disclosure, and the computer program causes a computer to perform the corresponding processes implemented by the motile terminal/terminal device in various methods in accordance with the implementations of the present disclosure, which will not be repeated herein for brevity.

An implementation of the present disclosure further provides a computer program product including a computer program.

Optionally, the computer program product may be applied to the network device in the implementations of the present disclosure, and the computer program causes a computer to perform the corresponding processes implemented by the network device in various methods in accordance with the implementations of the present disclosure, which will not be repeated herein for brevity.

Optionally, the computer program product may be applied to the motile terminal/terminal device in the implementations of the present disclosure, and the computer program causes a computer to perform the corresponding processes implemented by the motile terminal/terminal device in various methods in accordance with the implementations of the present disclosure, which will not be repeated herein for brevity.

An implementation of the present disclosure further provides a computer program. When the computer program is executed by a computer, the computer program causes the computer to execute the methods in accordance with the illustrated implementations.

Optionally, the computer program may be applied to the network device in the implementations of the present disclosure. When the computer program is run on a computer, the computer program causes the computer to perform the corresponding processes implemented by the network device in various methods in accordance with the implementations of the present disclosure, which will not be repeated herein for brevity.

An implementation of the present disclosure further provides a communication system, which may include the compression device 300 as shown in FIG. 19 and the decompression device 400 as shown in FIG. 20. The compression device 300 can be used to implement the corresponding functions implemented by the compression device in the above methods, and the decompression device 400 can be used to implement the corresponding functions implemented by the decompression device in the above methods, which will not be described herein for brevity.

It should be understood that the terms used in the implementations of the present invention and the appended claims are for the purpose of describing the specific implementations only, but are not intended to limit the implementations of the present disclosure.

For example, the singular forms "a", "an", "said", and "the" used in the implementations of the present disclosure and the appended claims are also intended to include the plural forms, unless the context clearly indicates otherwise.

Those of ordinary skill in the art may recognize that the elements and algorithm steps in various examples described in combination with the implementations disclosed herein can be implemented in electronic hardware, or a combination of computer software and electronic hardware. Whether these functions are implemented in hardware or software depends on the specific application and design constraints of the technical scheme. Those skilled in the art may use different methods to implement the described functions for each particular application, but such implementation should not be considered to be beyond the scope of the present disclosure.

The functions, if implemented in a form of software functional unit and sold or used as an independent product, may be stored in a computer readable storage medium. Based on such understanding, the technical scheme of the implementations of the present disclosure, in essence, or the part contributing to the prior art, or a part of the technical scheme, may be embodied in the form of a software product, which is stored in a storage medium, and includes several instructions for causing a computer device (which may be a personal computer, a server, or a network device, etc.) to perform all or part of steps of the methods in accordance with the implementations of the present disclosure. The aforementioned storage medium includes various media, such as a U disk, a mobile hard disk, a read-only memory, a random access memory, a magnetic disk, or an optical disk, which are capable of storing program codes.

Those skilled in the art may clearly understand that for convenience and conciseness of description, the specific working processes of the systems, devices and units described above may refer to the corresponding processes in the aforementioned method implementations and will not be repeated herein.

In several implementations provided by the present invention, it should be understood that the disclosed systems, devices and methods may be implemented in other ways.

For example, the division of the units or modules or components in the device implementations described above is only a logical function division, and there may be other division manners in actual implementation. For example, multiple units or modules or components may be combined or integrated into another system, or some units or modules or components may be ignored or not executed.

The units or modules or components described/shown as separate components may or may not be physically separated, i.e., they may be located in one place or may be distributed across multiple network units. Part or all of the units or modules or components may be selected according to actual needs to achieve the purpose of the implementations of the present disclosure.

At the end, it should be noted that the coupling or direct coupling or communication connection between the devices or units shown or discussed above may be via some interfaces, and the indirect coupling or communication connection between the devices or units may be electrical, mechanical or in other forms.

What are described above are merely specific implementations of the implementations of the present disclosure, but the protection scope of the implementations of the present disclosure is not limited thereto. Any variation or substitution that may easily occur to a person skilled in the art within the technical scope disclosed by the implementations of the present disclosure shall be included within the protection scope of the implementations of the present disclosure. Therefore, the protection scope of the implementations of the present disclosure shall be subject to the protection scope of the claims.

What I claim is:

1. A wireless transmission method, comprising:
   sending, by a compression device, a first data packet according to a compression parameter of an Ethernet frame; and
   sending a second data packet after receiving acknowledgement (ACK) of the first data packet, wherein the second data packet is a compressed data packet of the first data packet,
   wherein the compression parameter comprises a first index, wherein the first index is used for determining a first compression object, and wherein the first compression object at least comprises: a type field, a length field and a virtual local area network (VLAN) field,
   wherein the second data packet comprises: a sub-path ID, used to identify a context index or identifier that can be mapped to different data packets of the header compression configuration or object; and
   a packet compression indication, used to indicate whether the first or the second data packet is a compressed data packet or an uncompressed data packet.

2. The method according to claim 1, further comprising:
   receiving, by the compression device, the compression parameter sent by an access network device or a core network device.

3. The method according to claim 1, further comprising:
   determining, by the compression device, whether to compress the first data packet according to the compression parameter.

4. A wireless communication method, comprising:
   receiving, by a decompression device, a target data packet, wherein the target packet indicates a first data packet and a second data packet, wherein the second data packet is a compressed data packet of the first data packet, and wherein the second data package is received after receiving acknowledgement (ACK) of the first data packet; and
   determining, by the decompression device, whether to decompress the target data packets wherein the first data packet is sent according to a compression parameter,
   wherein the compression parameter comprises a first index, wherein the first index is used for determining a first compression object, and wherein the first compression object at least comprises: a type field, a length field and a virtual local area network (VLAN) field,
   wherein the second data packet comprises: a sub-path ID, used to identify a context index or identifier that can be mapped to different data packets of the header compression configuration or object; and
   a packet compression indication, used to indicate whether the first or the second data packet is a compressed data packet or an uncompressed data packet.

5. The method according to claim 4, further comprising:
   determining, by the decompression device, a compression object or a decompression object in the target data packet.

6. The method according to claim 5, wherein the compression object or decompression object comprises at least one of:
   a destination address field, a source address field, a type field, a length field, a virtual local area network VLAN field, Q-tags, C-tags, S-tags, a tag protocol ID (TPID), a virtual local area network ID (VID), a priority code point (PCP), a drop eligible indicator (DEI) and padding bits in a data field.

7. The method according to claim 4, further comprising:
   receiving, by the decompression device, the compression parameter sent by an access network device or a core network device.

8. The method according to claim 4, wherein the target data packet comprises at least one of:
   a sub-path ID, used to identify a context index or identifier that can be mapped to different data packets of the header compression configuration or object;
   a packet compression indication, used to indicate whether the current data packet is a compressed data packet or an uncompressed data packet.

9. A compression device, comprising a processor, a memory and a transceiver, wherein the memory is configured to store indication information, the transceiver is configured to communicate with other devices under control of the processor, and the processor is configured to call and run a computer program from the memory to:

send, through the transceiver, a first data packet according to a compression parameter of an Ethernet frame; and send, a second data packet after receiving acknowledgement (ACK) of the first data packet, the second data packet being a compressed data packet of the first data packet, wherein Y is an integer representing a number of the received feedback packets, wherein the compression parameter comprises a first index, wherein the first index is used for determining a first compression object, and wherein the first compression object at least comprises: a type field, a length field and a virtual local area network (VLAN) field, wherein the second data packet comprises: a sub-path ID, used to identify a context index or identifier that can be mapped to different data packets of the header compression configuration or object; and a packet compression indication, used to indicate whether the first or the second data packet is a compressed data packet or an uncompressed data packet.

10. The compression device according to claim 9, wherein the processor is further configured to:

receive, through the transceiver, the compression parameter sent by an access network device or a core network device.

11. The compression device according to claim 9, the processor is further configured to:

determine whether to compress the first data packet according to the compression parameter.

12. A decompression device, comprising a processor, a memory and a transceiver, wherein the memory is configured to store indication information, the transceiver is configured to communicate with other devices under control of the processor, and the processor is configured to call and run a computer program from the memory to:

receive, through the transceiver, a target data packet, wherein the target packet indicates a first data packet and a second data packet, wherein the second data packet is a compressed data packet of the first data packet, and wherein the second data package is received after receiving acknowledgement (ACK) of the first data packet; and determine whether to decompress the target data packet, wherein the first data packet is sent according to a compression parameter, wherein the compression parameter comprises a first index, wherein the first index is used for determining a first compression object, and wherein the first compression object at least comprises: a type field, a length field and a virtual local area network (VLAN) field, wherein the second data packet comprises: a sub-path ID, used to identify a context index or identifier that can be mapped to different data packets of the header compression configuration or object; and a packet compression indication, used to indicate whether the first or the second data packet is a compressed data packet or an uncompressed data packet.

13. The decompression device according to claim 12, wherein the processor is further configured to:

determine a compression object or a decompression object in the target data packet.

14. The decompression device according to claim 13, wherein the compression object or decompression object comprises at least one of:

a destination address field, a source address field, a type field, a length field, a virtual local area network VLAN field, Q-tags, C-tags, S-tags, a tag protocol ID (TPID), a virtual local area network ID (VID), a priority code point (PCP), a drop eligible indicator (DEI) and padding bits in a data field.

15. The decompression device according to claim 12, wherein the processor is further configured to:

receive, through the transceiver, the compression parameter sent by an access network device or a core network device.

16. The decompression device according to claim 12, wherein the processor is specifically configured to:

decompress the target data packet after sending Y feedback packets of the uncompressed data packets representing acknowledgement (ACK).

* * * * *